US012719359B2

(12) United States Patent
Zeng

(10) Patent No.: US 12,719,359 B2
(45) Date of Patent: Aug. 25, 2026

(54) POWER CONVERSION DEVICE

(71) Applicant: MetaPWR Electronics Co., Ltd., Shanghai (CN)

(72) Inventor: Jianhong Zeng, Shanghai (CN)

(73) Assignee: MetaPWR Electronics Co., Ltd., Shanghai (CN)

( * ) Notice: Subject to any disclaimer, the term of this patent is extended or adjusted under 35 U.S.C. 154(b) by 226 days.

(21) Appl. No.: 18/760,044

(22) Filed: Jul. 1, 2024

(65) Prior Publication Data

US 2025/0015717 A1 Jan. 9, 2025

(30) Foreign Application Priority Data

Jul. 3, 2023 (CN) ......................... 202310804901.5
Oct. 23, 2023 (CN) ......................... 202311370774.9

(51) Int. Cl.

*H02M 3/07* (2006.01)
*H02M 3/158* (2006.01)
*H02M 7/00* (2006.01)
*H02M 7/487* (2007.01)

(52) U.S. Cl.

CPC ......... *H02M 3/071* (2021.05); *H02M 3/1584* (2013.01); *H02M 7/003* (2013.01); *H02M 7/487* (2013.01)

(58) Field of Classification Search

CPC .... H02M 3/071; H02M 3/1584; H02M 7/003; H02M 7/487; H02M 1/0064; H02M 3/07; H02M 1/0095; H02M 7/4837; H02M 1/32

See application file for complete search history.

(56) References Cited

U.S. PATENT DOCUMENTS 11,362,576 B1 * 6/2022 Rizzolatti ............... H02M 3/07
12,438,436 B2 * 10/2025 Jin ...................... H02M 1/0054
2024/0380311 A1 * 11/2024 Zeng .................. H02M 1/0045

* cited by examiner

*Primary Examiner* — Kyle J Moody
(74) *Attorney, Agent, or Firm* — JCIPRNET

(57) ABSTRACT

According to the six-switch flying capacitor voltage buck-type conversion circuit and the four-switch flying capacitor voltage buck-type conversion circuit applied to the intermediate bus converter, further optimization is provided. On one hand, a power conversion device is provided, the voltage peak of the switch is absorbed by optimizing the clamping circuit and the layout thereof, the voltage stress of the switch is reduced, no extra loss is generated, and the conversion efficiency of the power conversion device is improved. On the other hand, by optimizing the current sampling circuit, the monitoring and control performance related to the current is optimized, and the size of the power conversion device is reduced.

27 Claims, 9 Drawing Sheets

POWER CONVERSION DEVICE

CROSS-REFERENCE TO RELATED APPLICATION

This application claims the priority benefit of China application no. 202310804901.5, filed on Jul. 3, 2023, and China application no. 202311370774.9, filed on Oct. 23, 2023. The entirety of each of the above-mentioned patent applications is hereby incorporated by reference herein and made a part of this specification.

BACKGROUND

With the development of artificial intelligence, the power requirements of an intelligent data processing chip, such as a GPU/CPU NPU and the like (collectively referred to as XPU) are higher and higher, so that the power of the server is greatly increased, the input voltage of the server gradually changes from 12V to 48V, and the working voltage of the XPU becomes lower and lower along with the progress of the process and gradually moves from 0.8V to 0.65V. Therefore, the gain ratio of the output voltage to the input voltage is lower and lower, so that the two-stage buck circuit architecture gradually becomes mainstream; and in order to obtain high conversion efficiency of 48V input to 0.65 V output, the intermediate bus voltage moves from 12V to 6.75V or even 3.3V.

Aiming at the solution of a power conversion device of 48V input and 12V-3.3V voltage-stabilized output, the conversion efficiency of the power conversion device is further improved, and the voltage peak clamping circuit of the switch in the operation process of the power conversion device is provided. The application further provides a simple and easy-to-implement current sampling circuit and method, which are used for monitoring and controlling the working current of the power conversion device.

Aiming at the requirements of the power conversion device with high power density and high conversion efficiency, the conversion efficiency of the power conversion device is further improved, the voltage peak clamping circuit of the switching in the operation process of the power conversion device is provided, the voltage peak energy absorbed by the clamping circuit is transmitted to the output side or the input side of the power conversion device, and the loss of the clamping circuit is reduced; and through a simple and easy-to-implement current sampling circuit and method, current detection in the operation process of the power conversion device is achieved for monitoring and control.

SUMMARY

A power conversion device comprises an input positive terminal, an input negative terminal, an output positive terminal, an output negative terminal and a three-switch bridge arm, wherein the input negative terminal is in short connection with the output negative terminal;

wherein the three-switch bridge arm is bridged between the input positive terminal and the input negative terminal and comprises a first upper switch, a first middle switch and a first lower switch, the first upper switch and the first middle switch are electrically connected to the first upper node, and the first middle switch and the first lower switch are electrically connected to the first lower node;

wherein the power conversion device further comprises a second lower switch, a magnetic assembly, a first flying capacitor, an input capacitor and an output capacitor, and the magnetic assembly comprises a first end, a second end and a third end; the first end of the magnetic assembly is electrically connected to the first lower node, the second end of the magnetic assembly and the second lower switch are electrically connected to the second lower node, the second lower switch is bridged between the second lower node and the input negative terminal, the third end of the magnetic assembly is electrically connected with the output positive terminal, and the first flying capacitor is bridged between the first upper node and the second lower node;

wherein the input capacitor is bridged between the input positive terminal and the input negative terminal, and the output capacitor is bridged between the output positive terminal and the output negative terminal;

wherein the power conversion device further comprises a first clamping diode and a first absorption capacitor, a positive electrode of the first clamping diode is electrically connected to a first lower node, a negative electrode of the first clamping diode is electrically connected to a first upper node, one end of the first absorption capacitor is electrically connected to a first upper node, and the other end of the first absorption capacitor is electrically connected to a second lower node.

Preferably, the first clamping diode and the first absorption capacitor are arranged close to the first lower switch, and the second lower switch is arranged adjacent to the first lower switch.

Preferably, the power conversion device further comprises a second upper switch, a second middle switch and a second flying capacitor; wherein the second upper switch and the second middle switch are electrically connected to the second upper node, the second middle switch and the second lower switch are electrically connected to the second lower node, the second upper switch is electrically connected to the input positive terminal, and the second flying capacitor is bridged between the second upper node and the first lower node.

Preferably, the power conversion device further comprises a second clamping diode and a second absorption capacitor, wherein the positive electrode of the second clamping diode is electrically connected with the second lower node, the negative electrode of the second clamping diode is electrically connected with the second upper node, one end of the second absorption capacitor is electrically connected with the second upper node, and the other end of the second absorption capacitor is electrically connected with the first lower node.

Preferably, the power conversion device comprises a third clamping diode and a third absorption capacitor; wherein the negative electrode of the third clamping diode is electrically connected with the second lower node, and the positive electrode of the third clamping diode is electrically connected with the input negative terminal; one end of the third absorption capacitor is electrically connected with the input positive terminal, and the other end of the third absorption capacitor is electrically connected with the input negative terminal.

Preferably, the power conversion device further comprises a fourth clamping diode and a fourth absorption capacitor; wherein the negative electrode of the fourth clamping diode is electrically connected with the first lower node, and the positive electrode of the fourth clamping diode is electrically connected with the input negative terminal; one end of the fourth absorption capacitor is electrically connected with the input positive terminal, and the other end of the fourth absorption capacitor is electrically connected with the input negative terminal.

Preferably, the power conversion device comprises a fifth clamping diode, a sixth clamping diode, a fifth absorption capacitor, a sixth absorption capacitor and a discharging resistor, wherein the negative electrode of the fifth clamping diode is electrically connected with the first upper node, the positive electrode of the fifth clamping diode is electrically connected with one end of the fifth absorption capacitor, and the other end of the fifth absorption capacitor is electrically connected with the input positive terminal; the positive electrode of the sixth clamping diode is electrically connected with the second lower node, the negative electrode of the sixth clamping diode is electrically connected with one end of the sixth absorption capacitor, the other end of the sixth absorption capacitor is electrically connected with the input negative terminal, and the discharging resistor is bridged between the positive electrode of the fifth clamping diode and the negative electrode of the sixth clamping diode.

Preferably, the power conversion device further comprises a seventh clamping diode, a seventh absorption capacitor and a linear voltage stabilizing circuit, wherein the positive electrode of the seventh clamping diode is electrically connected with the second lower node, the negative electrode of the seventh clamping diode is electrically connected with one end of the seventh absorption capacitor, the other end of the seventh absorption capacitor is electrically connected with the input negative terminal, and the negative electrode of the seventh clamping diode is electrically connected with one end of the linear voltage stabilizing circuit.

Preferably, the magnetic assembly comprises a first low-voltage winding and a second low-voltage winding, and the first low-voltage winding and the second low-voltage winding are magnetically coupled; the non-dotted terminal of the first low-voltage winding and the dotted terminal of the second low-voltage winding are electrically connected to the output positive terminal, the dotted terminal of the first low-voltage winding is electrically connected to the first lower node, and the non-dotted terminal of the second low-voltage winding is electrically connected to the second lower node.

Preferably, the magnetic assembly comprises an inductor winding, a first low-voltage winding and a second low-voltage winding, and the first low-voltage winding and the second low-voltage winding are magnetically coupled; the dotted terminal of the first low-voltage winding is electrically connected to the first lower node, and the non-dotted terminal of the first low-voltage winding is electrically connected to a winding junction; the non-dotted terminal of the second low-voltage winding is electrically connected to the second lower node, and the dotted terminal of the second low-voltage winding is electrically connected to the winding junction; one end of the inductor winding is electrically connected to the winding short connection point, and the other end of the inductor winding is electrically connected to the output positive terminal.

A power conversion device comprises an input positive terminal, an input negative terminal, an output positive terminal, an output negative terminal and a three-switch bridge arm, wherein the input negative terminal is in short connection with the output negative terminal;

wherein the three-switch bridge arm is bridged between the input positive terminal and the input negative terminal and comprises a first upper switch, a first middle switch and a first lower switch, the first upper switch and the first middle switch are electrically connected to the first upper node, and the first middle switch and the first lower switch are electrically connected to the first lower node;

wherein the power conversion device further comprises a second lower switch, a winding combination, a first flying capacitor, an input capacitor and an output capacitor, and the winding combination comprises a first end, a second end and a third end; the first end of the winding combination is electrically connected to the first lower node, the second end of the winding combination and the second lower switch are electrically connected to the second lower node, the second lower switch is bridged between the second lower node and the input negative terminal, the third end of the winding combination is electrically connected with the output positive terminal, and the first flying capacitor is bridged between the first upper node and the second lower node;

wherein the input capacitor is bridged between the input positive terminal and the input negative terminal, and the output capacitor is bridged between the output positive terminal and the output negative terminal;

wherein the winding combination further comprises a first low-voltage winding and a second low-voltage winding, the first low-voltage winding and the second low-voltage winding are connected in series and bridged between the first end and the second end, and the number of turns of the first low-voltage winding is the same as the number of turns of the second low-voltage winding;

wherein the power conversion device further comprises a first clamping diode, a first absorption capacitor and a clamping bridge arm circuit; the positive electrode of the first clamping diode is electrically connected with a first lower node, and the negative electrode of the first clamping diode is electrically connected with a first clamping point; one end of the first absorption capacitor is electrically connected with the first clamping point, and the other end of the first absorption capacitor is electrically connected with the input negative terminal; one end of the clamping bridge arm circuit is electrically connected with the first clamping point, and the other end of the clamping bridge arm circuit is electrically connected with the input positive terminal; and the clamping bridge arm circuit comprises a clamping winding, the clamping winding, the first low-voltage winding and the second low-voltage winding are magnetically coupled.

Preferably, the clamping bridge arm circuit is a clamping half-bridge circuit, and the clamping bridge arm circuit further comprises a third clamping diode, a fourth clamping diode, a third absorption capacitor, a fourth absorption capacitor, a second clamping point and a third clamping point;

the positive electrode of the third clamping diode is electrically connected with a second clamping point, and the negative electrode of the third clamping diode is electrically connected with the input positive terminal; the positive electrode of the fourth clamping diode is electrically connected with a first clamping point, and the negative electrode of the fourth clamping diode is electrically connected with a second clamping point; one end of the third absorption capacitor is electrically connected with a third clamping point, and the other end of the fourth absorption capacitor is electrically connected with the input positive terminal; one end of the fourth absorption capacitor is electrically connected with a first clamping point, and the other end of the fourth absorption capacitor is electrically connected with a third clamping point;

wherein the clamping winding is bridged between the second clamping point and the third clamping point; and the number of turns of the clamping winding is the same as the number of turns of the first low-voltage winding.

Preferably, the clamping bridge arm circuit is a clamping full-bridge circuit, and the clamping bridge arm circuit further comprises a third clamping diode, a fourth clamping diode, a fifth clamping diode, a sixth clamping diode, a second clamping point and a third clamping point;

wherein the positive electrode of the third clamping diode is electrically connected with a second clamping point, and the negative electrode of the third clamping diode is electrically connected with the input positive terminal; the positive electrode of the fourth clamping diode is electrically connected with a first clamping point, and the negative electrode of the fourth clamping diode is electrically connected with a second clamping point; the positive electrode of the fifth clamping diode is electrically connected with a third clamping point, and the negative electrode of the fifth clamping diode is electrically connected with the input positive terminal; the positive electrode of the sixth clamping diode is electrically connected with a first clamping point, and the negative electrode of the sixth clamping diode is electrically connected with a third clamping point;

wherein the clamping winding is bridged between the second clamping point and the third clamping point; and the number of turns of the clamping winding is twice the number of turns of the first low-voltage winding.

Preferably, the power conversion device comprises a second clamping diode and a second absorption capacitor; wherein the positive electrode of the second clamping diode is electrically connected with the second lower node, and the negative electrode of the second clamping diode is electrically connected with the first clamping point; one end of the second absorption capacitor is electrically connected with the first clamping point, and the other end of the second absorption capacitor is electrically connected with the input negative terminal.

Preferably, the power conversion device further comprises a second upper switch, a second middle switch and a second flying capacitor; the second upper switch and the second middle switch are electrically connected to the second upper node, the second middle switch and the second lower switch are electrically connected to the second lower node, the second upper switch is electrically connected with the input positive terminal, and the second flying capacitor is bridged between the second upper node and the first lower node.

Preferably, the power conversion device further comprises a third clamping diode and a third absorption capacitor; the negative electrode of the third clamping diode is electrically connected to the second lower node, and the positive electrode of the third clamping diode is electrically connected to the input negative terminal; one end of the third absorption capacitor is electrically connected to the input positive terminal, and the other end of the third absorption capacitor is electrically connected to the input negative terminal.

Preferably, the power conversion device further comprising a fourth clamping diode and a fourth absorption capacitor; the negative electrode of the fourth clamping diode is electrically connected to the first lower node, and the positive electrode of the fourth clamping diode is electrically connected to the input negative terminal. One end of the fourth absorption capacitor is electrically connected to the input positive terminal, and the other end of the fourth absorption capacitor is electrically connected to the input negative terminal.

Preferably, the power conversion device comprises an input positive terminal, an input negative terminal, an output positive terminal, an output negative terminal, a three-switch bridge arm, an upper node and a lower node, wherein the input negative terminal and the output negative terminal are short-circuited; the upper node comprises a first upper node and a second upper node, and the lower node comprises a first lower node and a second lower node;

wherein the three-switch bridge arm is bridged between the input positive terminal and the input negative terminal and comprises a first upper switch, a first middle switch and a first lower switch, the first upper switch and the first middle switch are electrically connected to the first upper node, and the first middle switch and the first lower switch are connected to the first lower node;

wherein the power conversion device further comprises a second lower switch, a winding combination, a first flying capacitor, an input capacitor and an output capacitor, and the winding combination comprises a first end, a second end and a third end; the first end of the winding combination is electrically connected to the first lower node, the second end of the winding combination and the second lower switch are electrically connected to the second lower node, the second lower switch is bridged between the second lower node and the input negative terminal, the third end of the winding combination is electrically connected with the output positive terminal, and the first flying capacitor is bridged between the first upper node and the second lower node;

wherein the input capacitor is bridged between the input positive terminal and the input negative terminal, and the output capacitor is bridged between the output positive terminal and the output negative terminal;

wherein the power conversion device further comprises a first clamping diode, an absorption capacitor and a first linear voltage stabilizing circuit, the positive electrode of the first clamping diode is electrically connected with one of the first lower node and the second lower node, the negative electrode of the first clamping diode is electrically connected with one end of the first absorption capacitor, the other end of the first absorption capacitor is electrically connected with the input negative terminal, and the negative electrode of the first clamping diode is electrically connected with one end of the linear voltage stabilizing circuit.

Preferably, the power conversion device further comprises a third clamping diode and a third absorption capacitor, the negative electrode of the third clamping diode is electrically connected with the second lower node, the positive electrode of the third clamping diode is electrically connected with the input negative terminal, one end of the absorption capacitor is electrically connected with the input positive terminal, and the other end of the absorption capacitor is electrically connected with the input negative terminal.

Preferably, the power conversion device further comprises a fifth clamping diode, a sixth clamping diode, a fifth absorption capacitor, a sixth absorption capacitor and a discharging resistor, the negative electrode of the fifth clamping diode is electrically connected with the first upper node, the positive electrode of the fifth clamping diode is electrically connected with one end of the fifth absorption capacitor, and the other end of the fifth absorption capacitor is electrically connected with the input positive terminal; the positive electrode of the sixth clamping diode is electrically connected with another one of the first lower node and the second lower node which is not electrically connected with the positive electrode of the first clamping diode, the negative electrode of the sixth clamping diode is electrically connected with one end of the sixth absorption capacitor, the other end of the sixth absorption capacitor is electrically connected with the input negative terminal, and the discharging resistor is bridged between the positive electrode of the fifth clamping diode and the negative electrode of the sixth clamping diode.

Preferably, the power conversion device further comprises a high-voltage winding, the high-voltage winding and the first flying capacitor being connected in series between a first upper node and a second lower node, and the high-voltage winding being coupled to the winding in a combined manner.

Preferably, the power conversion device comprises an input positive terminal, an input negative terminal, an output positive terminal, an output negative terminal, a three-switch bridge arm, an upper node and a lower node, wherein the upper node comprises a first upper node and a second upper node, and the lower node comprises a first lower node and a second lower node;

- wherein the three-switch bridge arm is bridged between the input positive terminal and the input negative terminal, the three-switch bridge arm comprises a first upper switch, a first middle switch and a first lower switch, the first upper switch and the first middle switch are electrically connected to the first upper node, and the first middle switch and the first lower switch are connected to the first lower node;
- wherein the power conversion device further comprises a second lower switch, a low-voltage winding, an inductor winding, a first flying capacitor, an input capacitor and an output capacitor; the low-voltage winding comprises a first low-voltage winding and a second low-voltage winding, the first end of the first low-voltage winding is electrically connected to the first lower node, the first end of the second low-voltage winding is electrically connected with the second lower node, the second end of the first low-voltage winding and the second end of the second low-voltage winding are electrically connected with one end of the inductor winding, and the other end of the inductor winding is electrically connected with the output positive terminal; the second lower switch is bridged between the second lower node and the input negative terminal, and the first flying capacitor is bridged between the first upper node and the second lower node;
- wherein the input capacitor is bridged between the input positive terminal and the input negative terminal, and the output capacitor is bridged between the output positive terminal and the output negative terminal;
- wherein the power conversion device further comprises an auxiliary winding, a first sampling resistor and a first sampling capacitor, the auxiliary winding, the first sampling resistor and the first sampling capacitor are electrically connected in series to form a first series sampling branch, and the first series sampling branch is bridged between one of the first lower node and the second lower node and the output positive terminal; the auxiliary winding comprises a first auxiliary winding and a second auxiliary winding, the first auxiliary winding is coupled with one of the first low-voltage winding and the second low-voltage winding, the second auxiliary winding is coupled with the inductor winding, and the voltage at the two ends of the first sampling capacitor is the first current sampling voltage; and the first auxiliary winding and the second auxiliary winding are electrically connected in series, and the auxiliary winding is wound along the winding path of the low-voltage winding and the winding path of the inductor winding.

Preferably, a first end of the second auxiliary winding and a first end of the inductor winding are dotted terminals.

Preferably, the power conversion device further comprises a second upper switch, a second middle switch and a second flying capacitor; wherein the second upper switch and the second middle switch are electrically connected to the second upper node, the second middle switch and the second lower switch are electrically connected to the second lower node, the second upper switch is electrically connected to the input positive terminal, and the second flying capacitor is bridged between the second upper node and the first lower node.

Preferably, the power conversion device further comprises a transformer magnetic core and an inductive magnetic core; the transformer magnetic core comprises two magnetic substrates, two transformer side columns and a transformer middle column; the transformer side columns and the transformer middle columns are arranged between the two magnetic substrates, and the transformer side columns and the transformer middle columns are sequentially arranged according to the sequence of one of the two transformer side columns, the transformer middle column and another one of the two transformer side columns; and a channel between the transformer middle column and the transformer side column is a first transformer winding channel and a second transformer winding channel respectively; the transformer magnetic core further comprises two opposite sides which are a first transformer winding channel side and a second transformer winding channel side 1 respectively, and the first transformer winding channel and the second transformer winding channel both penetrate through the first transformer winding channel side and the second transformer winding channel side; the inductor magnetic core comprises two magnetic substrates, two inductor side columns and an inductor middle column; the inductor side column and the inductor middle column are arranged between the two magnetic substrates, and the inductor side columns and the inductor middle columns are sequentially arranged according to the sequence of one of the two inductor side columns, the inductor middle column and another one of the two inductor side columns; a channel between the inductor middle column and the inductor side column is a first inductor winding channel and a second inductor winding channel respectively; the inductor magnetic core further comprises two opposite sides which are a first inductor winding channel side and a second inductor winding channel side 1 respectively, and the first inductor winding channel and the second inductor winding channel both penetrate through the first inductor winding channel side and the second inductor winding channel side; and the second transformer winding channel side is arranged adjacent to the first inductor winding channel side.

Preferably, the first auxiliary winding is wound around two circles in the first direction from the first end to the second end, then the first auxiliary winding is wound around the transformer side column along the outer side of the transformer magnetic core from the first transformer winding channel side, and then the first auxiliary winding is electrically connected with the second auxiliary winding through the second transformer winding channel side; the second auxiliary winding is wound two circles around the inductor middle column in the second direction from the first end to the second end, passes through the first inductor winding channel side, and is electrically connected with the output positive pin of the power conversion circuit through the first sampling resistor and the first sampling capacitor which are connected in series.

Preferably, the auxiliary winding sequentially penetrates through the first transformer winding channel, the first inductor winding channel, the second inductor winding channel and the second transformer winding channel from the first end of the first auxiliary winding to the second end of the second auxiliary winding, and after two circles are wound around the transformer middle column and the inductor middle column, the auxiliary winding is electrically connected with the output positive pin of the power conversion circuit through the first sampling resistor and the first sampling capacitor which are connected in series.

The beneficial effects of the application are that:

(1) the voltage stress of the switching tube is reduced by optimizing the voltage peak clamping circuit and the layout of the switching tube, and the conversion efficiency of the power conversion device is improved.

(2) optimizing the current-related monitoring and control performance by optimizing the current sampling circuit and reducing the volume of the power conversion device.

DESCRIPTION OF THE EMBODIMENTS

Figure 1A:
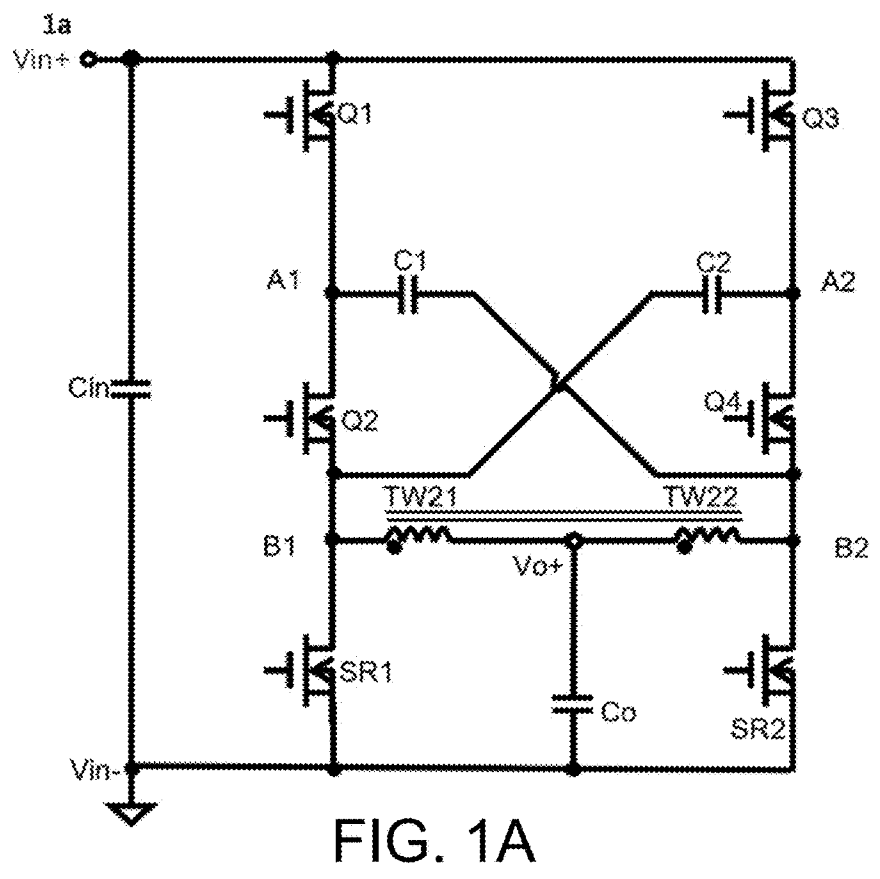
FIG. 1A, FIG. 1B and FIG. 1C are schematic diagrams of a six-switch power conversion circuit.

The present application discloses various embodiments or examples of implementing the thematic technological schemes mentioned. To simplify the disclosure, specific instances of each element and arrangement are described below. However, these are merely examples and do not limit the scope of protection of this application. For instance, a first feature recorded subsequently in the specification formed above or on top of a second feature may include an embodiment where the first and second features are formed through direct contact, or it may include an embodiment where additional features are formed between the first and second features, allowing the first and second features not to be directly connected. Additionally, these disclosures may repeat reference numerals and/or letters in different examples. This repetition is for brevity and clarity and does not imply a relationship between the discussed embodiments and/or structures. Furthermore, when a first element is described as being connected or combined with a second element, this includes embodiments where the first and second elements are directly connected or combined with each other, as well as embodiments where one or more intervening elements are introduced to indirectly connect or combine the first and second elements.

One of the cores of the present application is to provide a power conversion device, which reduces the voltage stress of a switch by optimally designing a clamping circuit and the layout thereof, and improves the conversion efficiency of the power conversion device. By optimizing the current sampling circuit, the monitoring and control performance related to the current is optimized, and the volume of the power conversion device is reduced.

The application also provides a power conversion device. By optimizing the current sampling circuit, the current-related monitoring and control performance is optimized, and the size of the power conversion device is reduced.

The technical solutions in the embodiments of the present disclosure will be clearly and completely described below with reference to the accompanying drawings in the embodiments of the present disclosure. Obviously, the described embodiments are only a part but not all of the embodiments of the present application. All other embodiments obtained by a person of ordinary skill in the art based on the embodiments of the present application without creative efforts shall fall within the protection scope of the present application.

Figure 1B:
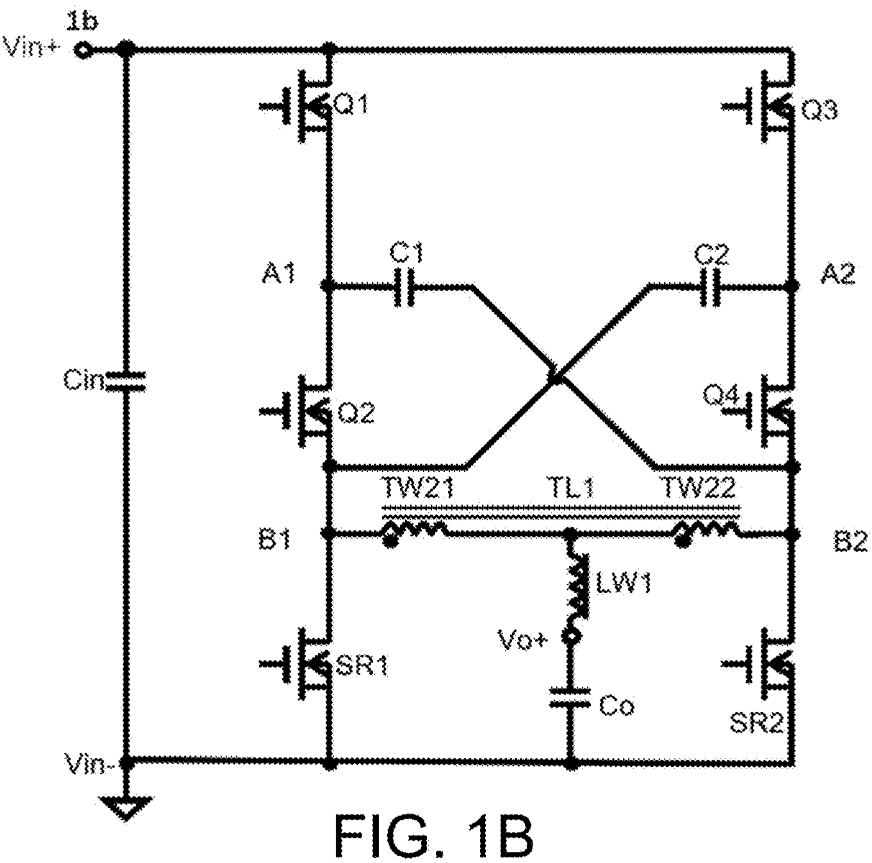
Figure 1C:
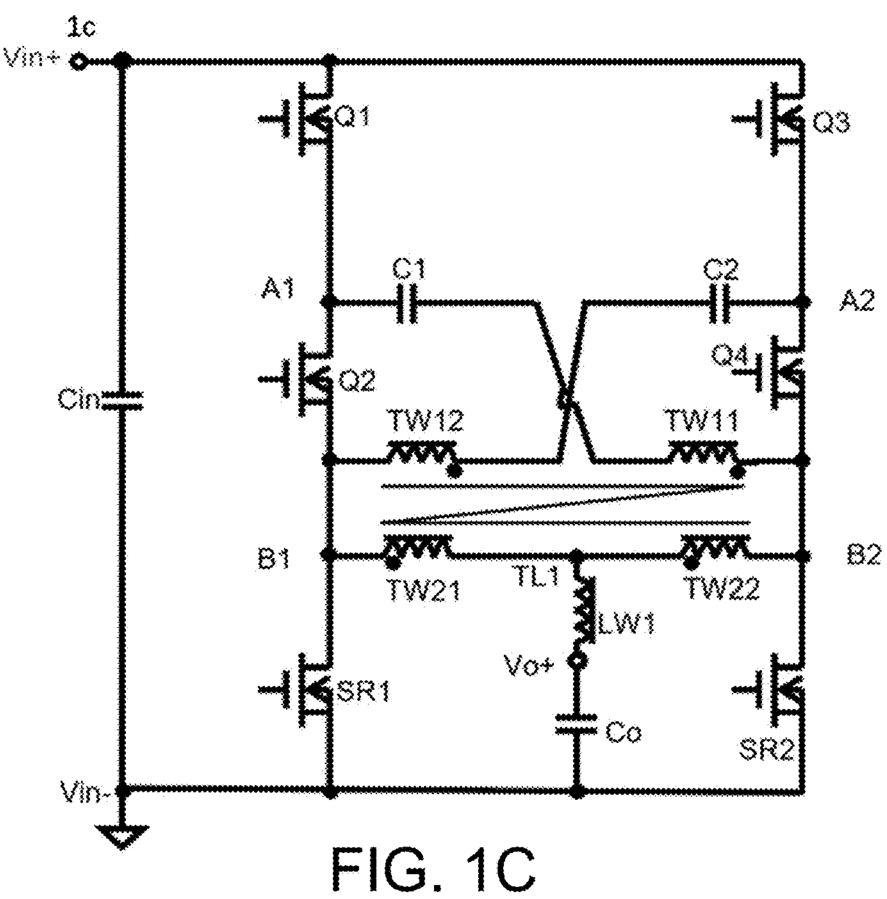
Figure 2A:
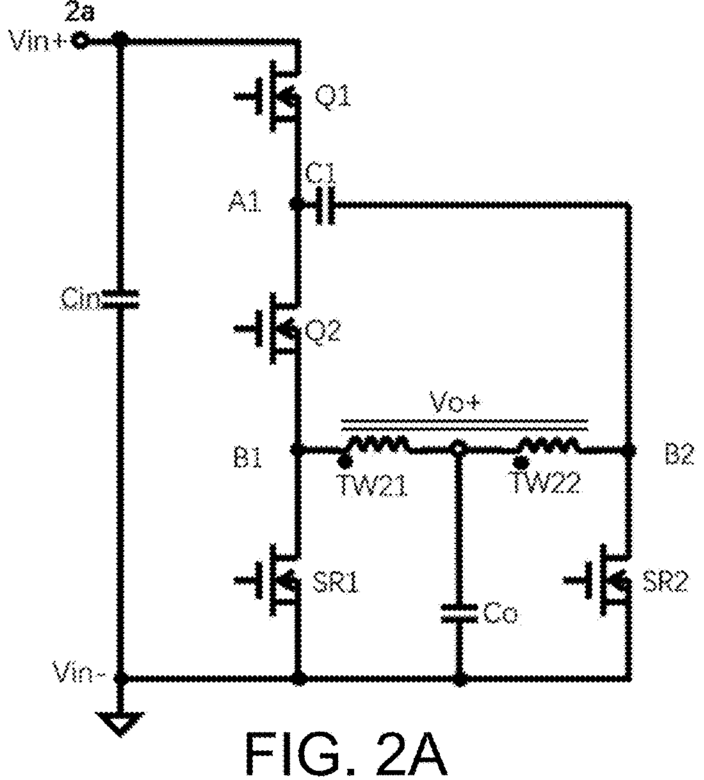
FIG. 2A, FIG. 2B and FIG. 2C are schematic diagrams of a four-switch power conversion circuit.
Figure 2B:
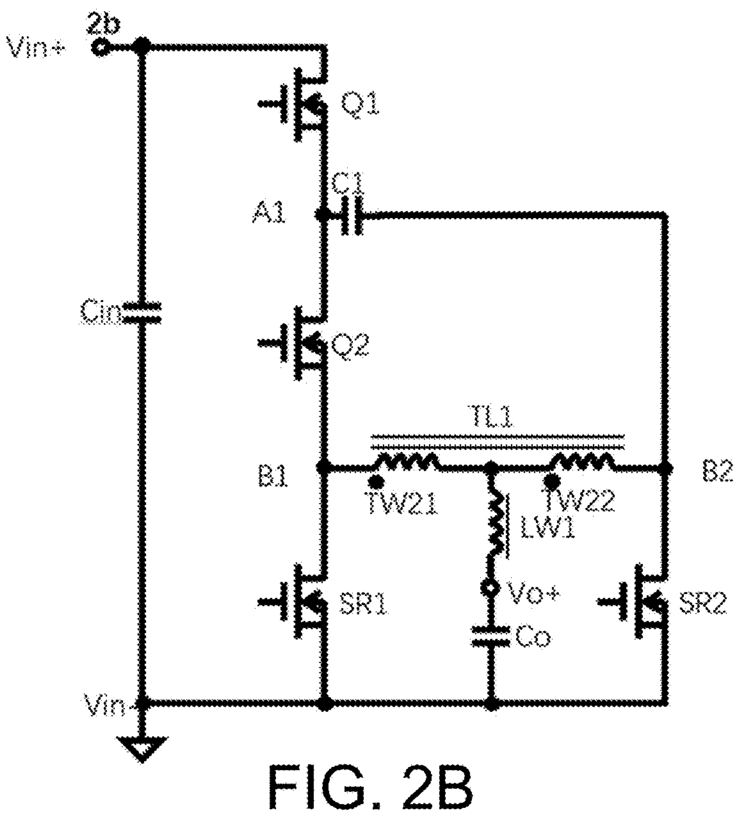
Figure 2C:
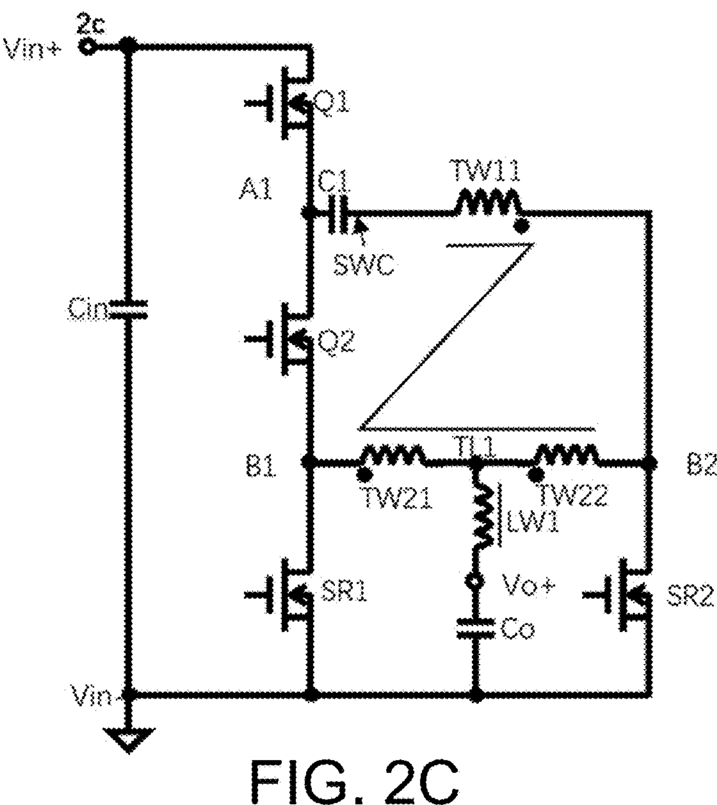

The six-switch flying capacitor Buck-type power conversion circuit shown in FIG. 1A to FIG. 1C, and the four-switch flying capacitor Buck-type power conversion circuit in FIG. 2A to FIG. 2C can be applied to an intermediate bus power conversion device of 48V input and 12V-3.3V voltage-stabilized output.

The six-switch flying capacitor voltage Buck-type power conversion circuit shown in FIGS. 1A to 1C comprises an input positive terminal, an input negative terminal, an output positive terminal, an output negative terminal, two three-switch bridge arms, two flying capacitors, two low-voltage windings, an input capacitor and an output capacitor. Referring to the power conversion circuit 1*a* shown in FIG. 1A, the input negative terminal Vin− and the output negative terminal Vo− are short-circuited. The two three-switch bridge arms are respectively a first switch bridge arm 10*a* and a second switch bridge arm 10*b*, wherein the first switch bridge arm 10*a* comprises an upper switch Q1, a middle switch Q2 and a lower switch SR1; the upper switch Q1 and the middle switch Q2 are electrically connected to the upper node A1; the middle switch Q2 and the lower switch SR1 are electrically connected to the lower node B1; the upper switch Q1 is electrically connected to the input positive terminal Vin+; the lower switch SR1 is electrically connected to the input negative terminal Vin−. The second switch bridge arm 10*b* comprises an upper switch Q3, a middle switch Q4 and a lower switch SR2; the upper switch Q3 and the middle switch Q4 are electrically connected to the upper node A2; the middle switch Q4 and the lower switch SR2 are electrically connected to the lower node B2; the upper switch Q3 is electrically connected to the input positive terminal Vin+; the lower switch SR2 is electrically connected to the input negative terminal Vin−; the input capacitor Cin is bridged between the input positive terminal Vin+ and the input negative terminal Vin−, and the output capacitor Co is bridged between the output positive terminal Vo+ and the output negative terminal Vo−; the flying capacitor C1 is bridged between the upper node A1 of the first switch bridge arm 10*a* and the lower node B2 of the second switch bridge arm 10*b*, and the flying capacitor C2 is bridged between the upper node A2 of the second switch bridge arm 10*b* and the lower node B1 of the first switch bridge arm 10*a*. The first end of the low-voltage winding TW21 is electrically connected with the lower node B1, the first end of the low-voltage winding TW22 is electrically connected with the lower node B2, and the second end of the low-voltage winding TW21 and the second end of the low-voltage winding TW22 are electrically connected to the winding junction TL 1, as shown in FIG. 1A, a winding junction TL1 is equivalent to an output positive terminal Vo+; the low-voltage winding TW 21 and the low-voltage winding TW 22 are coupled to one magnetic core, and the first end of the low-voltage winding TW 21 and the second end of the low-voltage winding TW 22 are dotted terminals (i.e., the polarities are the same), and are labeled as point ends.

On the basis of the power conversion circuit 1*a* shown in FIG. 1A, in the power conversion circuit 1*b* shown in FIG. 1B, the coupling coefficient of the low-voltage winding TW21 and the low-voltage winding TW22 is increased to be close to an ideal transformer, the inductor LW1 is increased, and is bridged between the winding junction TL1 and the output positive terminal Vo+. On the basis of the power conversion circuit 1*b* shown in FIG. 1B, the power conversion circuit 1*c* shown in FIG. 1C further comprises two high-voltage windings TW11 and TW12. The high-voltage windings TW11 and TW12 and the low-voltage windings TW21 and TW22 are wound on the same magnetic core. The high-voltage winding TW11 and the flying capacitor C1 are electrically connected in series and bridged between the upper node A1 and the lower node B2. The first end of the high-voltage winding TW11 is connected in series with the flying capacitor C1, and the second end of the high-voltage winding TW11 is short-circuited with the lower node B2. The high-voltage winding TW12 and the flying capacitor C2 are electrically connected in series and are bridged between the upper node A2 and the lower node B1; the first end of the high-voltage winding TW12 is connected in series with the flying capacitor C2, and the second end of the high-voltage winding TW12 is short-circuited with the lower node B1. The second end of the high-voltage winding TW11, the first end of the high-voltage winding TW12, the first end of the low-voltage winding TW21, and the second end of the low-voltage winding TW22 are dotted terminal (i.e., the polarities are the same), and are marked as point ends.

The four-switch flying capacitor step-down power conversion circuit of FIGS. 2A to 2C comprises an input positive terminal, an input negative terminal, an output positive terminal, an output negative terminal, a three-switch bridge arm, a lower switch SR2, a flying capacitor, two low-voltage windings, an input capacitor and an output capacitor. Referring to the power conversion circuit 2*a* shown in FIG. 2A, the input negative terminal Vin− and the output negative terminal Vo− are short-circuited; the three-switch bridge arm comprises an upper switch Q1, a middle switch Q2 and a lower switch SR1; the upper switch Q1 and the middle switch Q2 are electrically connected to the upper node A1; the middle switch Q2 and the lower switch SR1 are electrically connected to the lower node B1; the upper switch Q1 is electrically connected to the input positive terminal Vin+; the lower switch SR1 is electrically connected to the input negative terminal Vin−; one end of the lower switch SR2 is electrically connected with the input negative terminal, and the other end of the lower switch SR2 is electrically connected with the lower node B2. The input capacitor Cin is bridged between the input positive terminal Vin+ and the input negative terminal Vin−, and the output capacitor Co is bridged between the output positive terminal Vo+ and the output negative terminal Vo−. The flying capacitor C1 is bridged between the upper node A1 and the lower node B2. The first end of the low-voltage winding TW21 is electrically connected with the lower node B1, the first end of the low-voltage winding TW22 is electrically connected with the lower node B2, and the second end of the low-voltage winding TW21 and the second end of the low-voltage winding TW22 are electrically connected to the winding junction TL1. In FIG. 2A, a winding junction TL1 is equivalent to an output positive terminal Vo+. The low-voltage winding TW21 and the low-voltage winding TW22 are coupled to one magnetic core, and the first end of the low-voltage winding TW21 and the second end of the low-voltage winding TW22 are dotted terminals (i.e., the polarities are the same), and are labeled as point ends.

On the basis of the power conversion circuit 2*a* shown in FIG. 2A, the coupling coefficient of the low-voltage winding TW21 and the low-voltage winding TW22 is increased to be close to an ideal transformer, the inductor LW1 is increased, and is bridged between the winding junction TL1 and the output positive terminal Vo+. On the basis of the power conversion circuit 2*b* shown in FIG. 2B, the power conversion circuit 2*c* shown in FIG. 2C further comprises a high-voltage winding TW11. The high-voltage winding TW11 and the low-voltage winding TW21 and TW22 are wound on the same magnetic core. The high-voltage winding TW11 is electrically connected in series with the flying capacitor C1 and is bridged between the upper node A1 and the lower node B2, the first end of the high-voltage winding TW11 is connected in series with the flying capacitor C1, and the second end of the high-voltage winding TW11 is short-circuited with the lower node B2. The second end of the high-voltage winding TW11, the first end of the low-voltage winding TW21 and the second end of the low-voltage winding TW22 are dotted terminals (equivalent to the same polarity) and are marked as point ends.

The low-voltage windings TW21 and TW22 in FIG. 1A form a winding combination, the first end of the low-voltage winding TW21 is the first end of the winding combination, the first end of the low-voltage winding TW22 is the second end of the winding combination, and the second end of the low-voltage winding TW21 and the second end of the low-voltage winding TW22 are the third end of the winding combination. The low-voltage windings TW21 and TW22 and the inductor winding LW1 in FIG. 1B and FIG. 1C form a winding combination, the first end of the low-voltage winding TW21 is the first end of the winding combination, the first end of the low-voltage winding TW22 is the second end of the winding combination, and the end, not electrically connected with the low-voltage winding, of the inductor winding is the third end of the winding combination. Similarly, the definition of the winding combination in FIG. 2A to FIG. 2C can be defined with reference to the winding combination shown in FIG. 1A to FIG. 1C, and details are not described herein again.

Embodiment 1

Figure 3A:
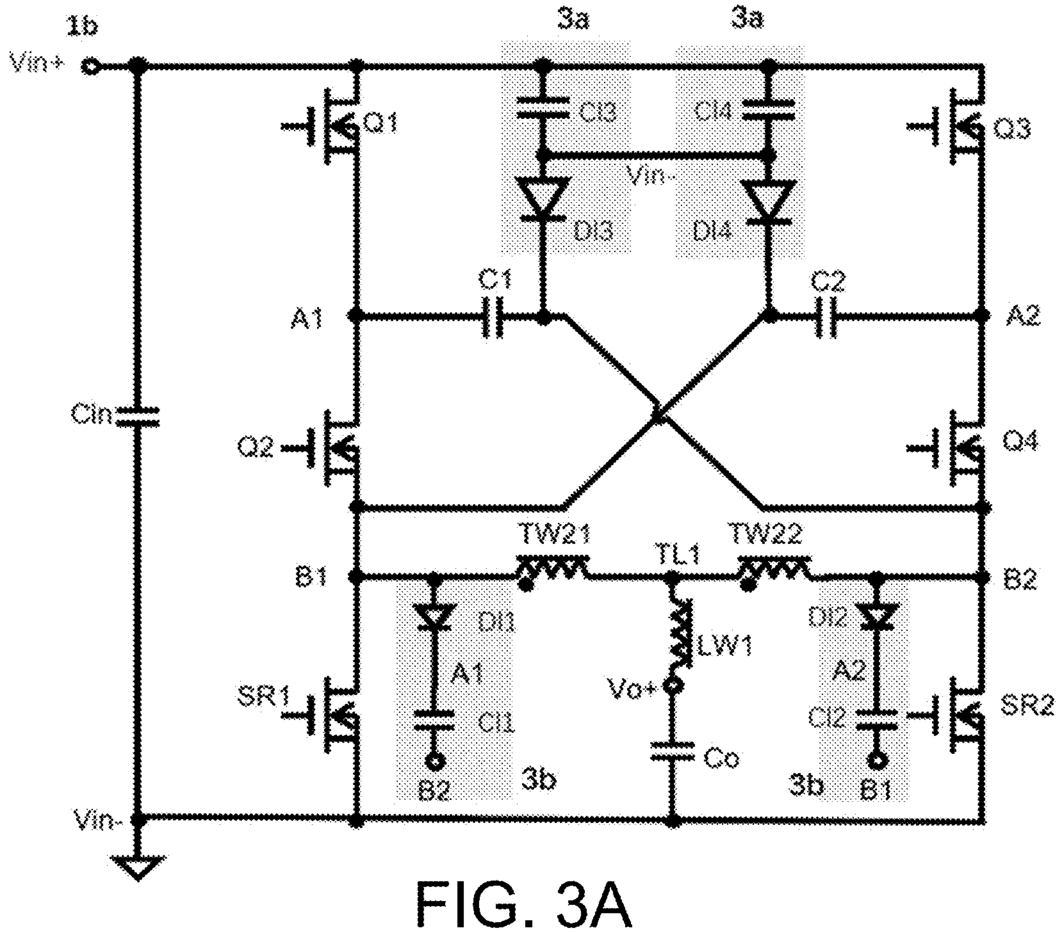
FIG. 3A is a schematic diagram of a clamping circuit of a power conversion circuit.
Figure 3B:
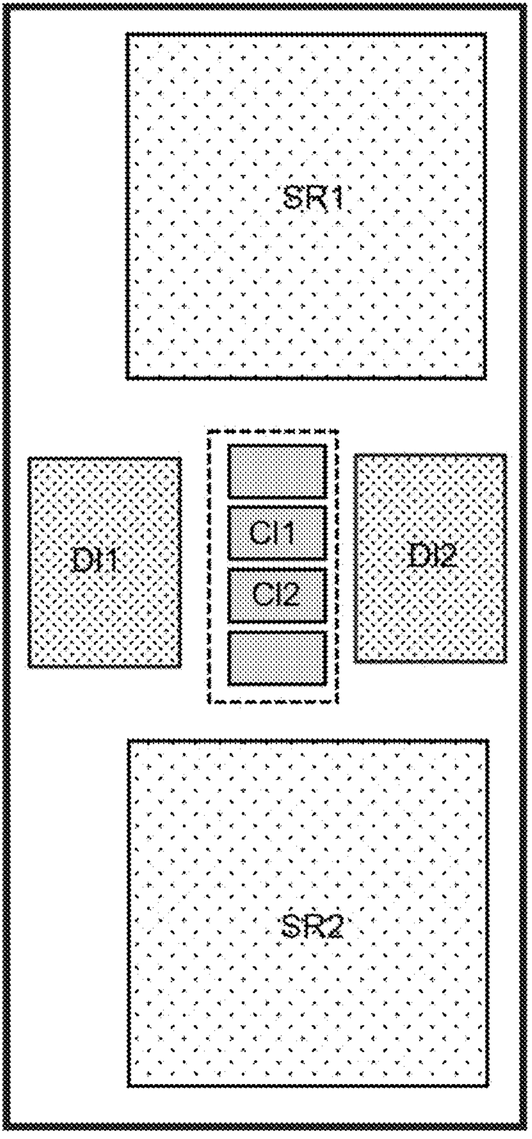
FIG. 3B is a schematic diagram of a clamping circuit and a lower switch layout.

In order to protect the switch in the power conversion circuit, and in order to prevent voltage spikes at the two ends of the switch from damaging the switch caused by the current flowing through the switch when it is turned-off. An optimized voltage peak clamping circuit of the switch is provided, and the power conversion circuit 1_b_ shown in FIG. 1B is taken as an example for description. The power conversion device further comprises clamping circuits 3_a_ and 3_b_, as shown in FIG. 3A, the clamping circuits 3_a_ and 3_b_ each comprise a clamping diode and an absorption capacitor, wherein the clamping circuit 3_a_ is used for protecting the upper switch, and the clamping circuit 3_b_ is used for protecting the lower switch. The clamping circuit 3_b_ of the protection lower switch SR1 comprises a clamping diode Dl1 and an absorption capacitor Cl1. The positive electrode of the clamping diode Dl1 is electrically connected with the lower node B1, the negative electrode of the clamping diode Dl1 is electrically connected with the upper node A1, and the absorption capacitor Cl1 is connected with the flying capacitor C1 in parallel. Similarly, the clamping circuit 3_b_ of the lower switch SR2 comprises a clamping diode Dl2 and an absorption capacitor Cl2, the positive electrode of the clamping diode Dl2 is electrically connected with the lower node B2, the negative electrode of the clamping diode Dl2 is electrically connected with the upper node A2, and the absorption capacitor Cl2 is connected with the flying capacitor C2 in parallel. A clamping diode Dl1 and a flying capacitor Cl1 are added to the lower switch SR1, and the area surrounded by the clamping diode Dl1, the absorption capacitor Cl1 and the lower switch SR2 is minimum on the layout shown in FIG. 3B. The clamping diode Dl2 and the flying capacitor Cl2 are added for the lower switch SR2, and the area surrounded by the clamping diode Dl2, the absorption capacitor Cl2 and the lower switch SR1 in series and the lower switch SR2 is minimum on the layout shown in FIG. 3B. The switch SR1 is taken as an example, when the lower switch SR1 is turned off, the lower switch SR2 is in on state, and the energy of the voltage spike of the lower switch SR1 is stored in the absorption capacitor Cl1 through the clamping diode Dl1 and the lower switch SR2. The absorption capacitor Cl1 is connected in parallel with the flying capacitor C1, and redundant energy of the absorption capacitor Cl1 can be transferred into the flying capacitor C1, so that the voltages at the two ends of the absorption capacitor Cl1 and the flying capacitor C1 are the same, that is, equal to Vin/2. The voltage spikes at the two ends of the lower switch SR1 are effectively absorbed in each switching period, and the voltage spike energy is fed back to the flying capacitor in the power conversion circuit, so that the effect of no extra loss is generated. Similarly, the absorption capacitor Cl2, the clamping diode Dl2, the lower switch SR1 and the lower switch SR2 have similar leakage-source two-end voltage clamping protection functions, and details are not described herein again. The specific layout of FIG. 3B is that the lower switch SR1, the absorption capacitor Cl1, the absorption capacitor Cl2 and the lower switch SR2 are sequentially placed, and the absorption diodes Dl1 and Dl2 are respectively arranged on two sides of the absorption capacitors Cl1 and Cl2. The layout method is not limited thereto, in general, the lower switches SR1 and SR2 are placed symmetrically, the absorption capacitors Cl1 and Cl2 are placed symmetrically, and the absorption diodes Dl1 and Dl2 are placed symmetrically, so that a loop formed by the lower switch SR1, the absorption diode Dl1, the absorption capacitor Cl1 and the lower switch SR2 is approximately equal to a loop formed by the lower switch SR2, the absorption diode Dl2, the absorption capacitor Cl2 and the lower switch SR1, and the layout of the minimum loop area is achieved, so that the scope of the application is met.

The clamping circuit 3_a_ of the upper switch Q1 comprises a clamping diode Dl3 and an absorption capacitor Cl3, the absorption capacitor Cl3 and the clamping diode Dl3 are arranged close to the upper switch Q1, and the absorption capacitor Cl3 is bridged between the input positive terminal Vin+ and the input negative terminal Vin−; the clamping diode Dl3 is electrically connected between the absorption capacitor Cl3 and the flying capacitor C1, the positive electrode of the clamping diode Dl3 is electrically connected with the input negative terminal Vin−, and the negative electrode of the clamping diode Dl3 is electrically connected with the lower node B2. A series branch comprises an absorption capacitor Cl3 and a clamping diode Dl3 and a flying capacitor C1, wherein the series branch is connected to the drain end and the source end of the upper switch Q1 in parallel and in the shortest distance, and a minimum loop is formed. Similarly, the clamping circuit 3_a_ of the upper switch Q3 comprises a clamping diode Dl4 and an absorption capacitor Cl4, the absorption capacitor Cl4 and the clamping diode Dl1 are arranged close to the upper switch Q3, and the absorption capacitor Cl4 is bridged between the input positive terminal Vin+ and the input negative terminal Vin−. The clamping diode Dl1 is electrically connected between the absorption capacitor Cl4 and the flying capacitor C2 in series, the positive electrode of the clamping diode Dl1 is electrically connected with the input negative terminal Vin−, and the negative electrode of the clamping diode Dl1 is electrically connected with the lower node B1; and the series branch comprises the absorption capacitor Cl4, the clamping diode Dl1 and the flying capacitor C2 is connected in parallel at the drain end and the source end of the upper switch Q3, and a minimum loop is formed. When the upper switch Q1 is turned off, the absorption capacitor Cl3, the clamping diode Dl3 and the flying capacitor C1 absorb the voltage spike at the drain end and the source end generated when the upper switch Q1 is turned off. The absorption capacitor Cl3 and the flying capacitor C1 can automatically balance own charges through the power circuit, so that the absorption capacitor Cl3, the clamping diode Dl3 and the flying capacitor C1 can continuously absorb voltage spikes generated when the switch Q1 is turned off in each switching period, and no extra loss is generated. Similarly, the absorption capacitor Cl4, the clamping diode Dl4 and the flying capacitor C2 have similar clamping protection functions for the leakage-source end voltage of the upper switch Q3, and details are not described herein again.

Figure 3C:
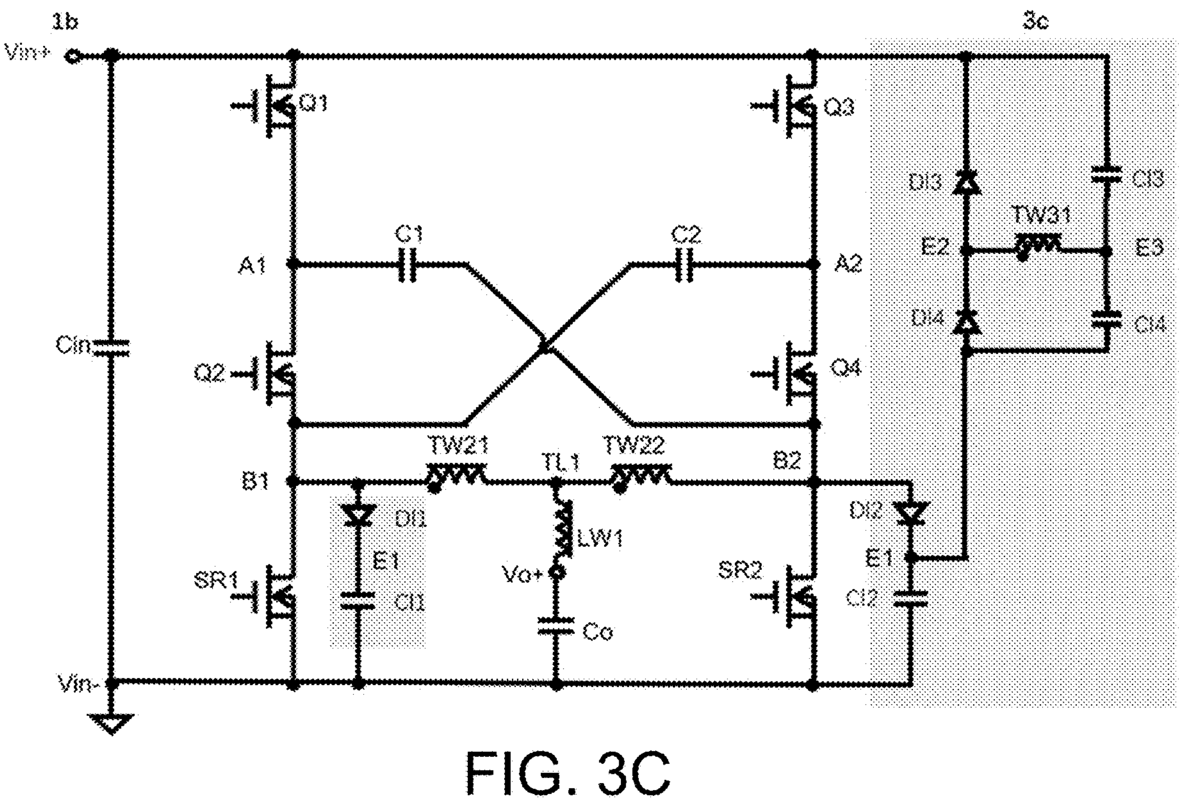
FIG. 3C and FIG. 3D are schematic diagrams of another clamping circuit of the power conversion circuit.
Figure 3D:
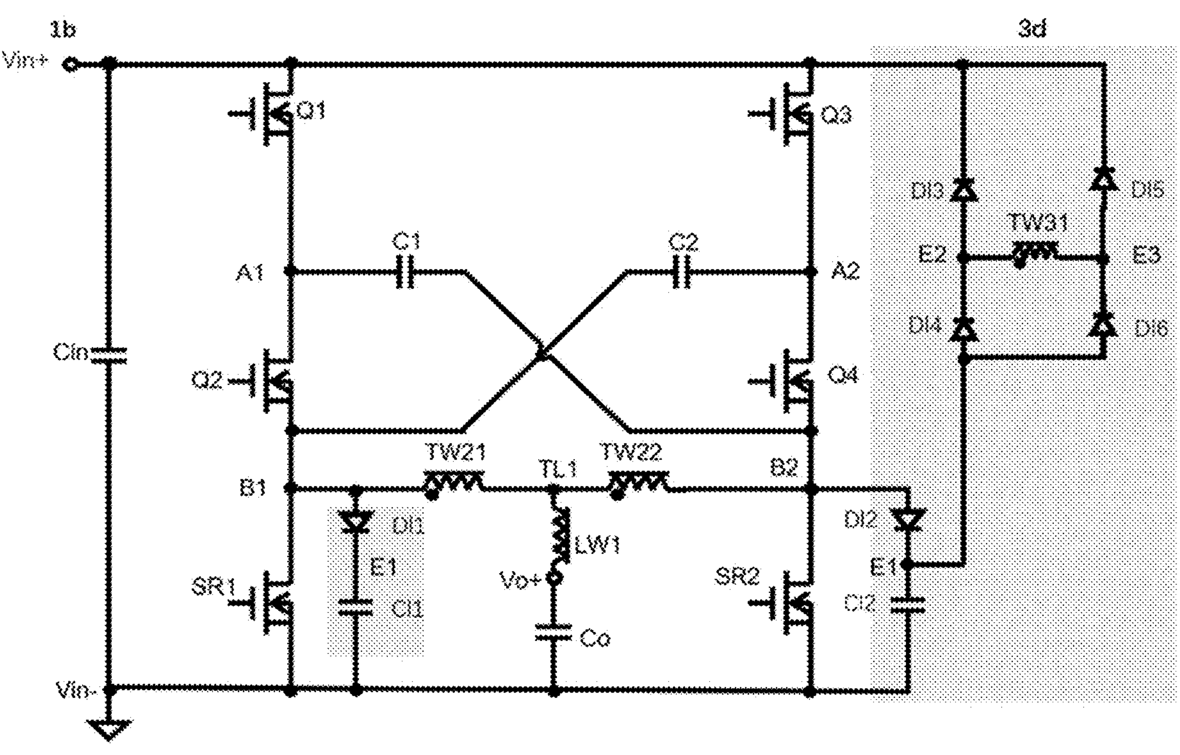

The clamp circuits 3_a_ and 3_b_ shown in FIG. 3A are applicable to a power conversion circuit 1_b_, such as the power conversion circuit shown in FIGS. 1A-1C and 2A-2C. In addition, in some application scenes with the duty ratio of the upper switch being smaller than 0.5, the clamp circuits 3_a_ and 3_b_ can be used. When the duty ratio of the upper switch is greater than or equal to 0.5, and the embodiment provides another optimized voltage peak clamp circuit of the switch, as shown in FIGS. 3C and 3D. The clamp circuit 3_c_ shown in FIG. 3C comprises a clamp winding TW31, clamp diodes Dl1/Dl2/Dl3/Dl4 and absorption capacitors Cl1/Cl2/Cl3/Cl4. The positive electrode of the clamp diode Dl1 is electrically connected with the lower node B1, the positive electrode of the clamping diode Dl1 is electrically connected with one end of the absorption capacitor Cl1 at the clamping point E1 The other end of the absorption capacitor Cl1 is electrically connected with the input negative terminal Vin−; that is, the series branch of the clamping diode Dl1 and the absorption capacitor Cl1 is connected in parallel at two ends of the lower switch SR1; the positive electrode of the clamping diode Dl2 is electrically connected with the lower node B2, the negative electrode of the clamping diode Dl2 is electrically connected with one end of the absorption capacitor Cl2 at the clamping point E1, and the other end of the absorption capacitor Cl2 is electrically connected with the input negative terminal Vin−; that is, a series branch of the clamping diode Dl2 and the absorption capacitor Cl2 is connected in parallel at two ends of the lower switch SR2; the negative electrode of the clamping diode Dl1 and the negative electrode of the clamping diode Dl2 are short-connected at the clamping point E1. The clamping diode Dl3 is electrically connected with the input positive terminal, the positive electrode of the clamping diode Dl3 is electrically connected with the negative electrode of the clamping diode Dl1 at the clamping point E2, and the positive electrode of the clamping diode Dl4 is electrically connected with the clamping point E1. One end of the absorption capacitor Cl3 is electrically connected with the input positive terminal, the other end of the absorption capacitor Cl3 is electrically connected with one end of the absorption capacitor Cl4 at the clamping point E3, and the other end of the absorption capacitor Cl4 is electrically connected with the clamping point E1. The clamping diodes Dl3 and Dl4, the absorption capacitors Cl3 and Cl4 and the clamping winding TW31 form a half-bridge circuit. The clamping winding TW31 is bridged between the clamping points E2 and E3, the clamping winding TW31, the low-voltage winding TW21 and TW22 are coupled to the same magnetic core, and the end which is electrically connected with the clamping point E2 is marked as a point end. The ratio of turns of the two low-voltage windings and the clamping winding is 1:1:1. The peak energy of the switches SR1 and SR2 is stored in the absorption capacitors Cl1 and Cl2. The voltage at the two ends of the low-voltage windings TW21 and TW22 is an alternating voltage VIN/4, and the clamping windings TW31 are coupled with alternating voltages at the two ends of the low-voltage windings TW21 and TW22, so that the voltages at the two ends of the absorption capacitors Cl1 and Cl2 are clamped to VIN/2, the voltages at the two ends of the lower switches SR1 and SR2 are effectively clamped, redundant peak energy is effectively absorbed and fed back to the power conversion circuit 1*b*, and the energy loss of the power conversion circuit is reduced. The absorption capacitors Cl3 and Cl4 in FIG. 3C can be replaced by clamp diodes Dl5 and Dl6. As shown in FIG. 3D, the clamp diode Dl3/Dl4/Dl5/Dl6 and the clamp winding TW31 form a full-bridge circuit; and the ratio of turns of the two low-voltage windings and the clamping winding is 1:1:2. The negative electrode of the clamping diode Dl5 is electrically connected with the input positive terminal Vin+. The positive electrode of the clamping diode Dl5 is electrically connected with the negative electrode of the clamping diode D6 at the clamping point E3, the positive electrode of the clamping diode Dl6 is electrically connected with the clamping point E1. The clamping circuit 3*s* shown in FIG. 3D of the positive electrode can also effectively clamp the voltages at the two ends of the lower switches SR1 and SR2, redundant peak energy is effectively absorbed and fed back to the power conversion circuit 1*b*, and the energy loss of the power conversion circuit is reduced. In the embodiment, the clamping protection circuit of the upper switch can adopt the clamping circuit 3*a* shown in FIG. 3A, but is not limited thereto. The clamp circuit 3*c* shown in FIG. 3C and the clamp circuit 3*d* shown in FIG. 3D are not limited to a power conversion circuit applied to a duty ratio greater than or equal to 0.5, and may also be applied to a power conversion circuit having a duty ratio less than 0.5.

Embodiment 2

Figure 4:
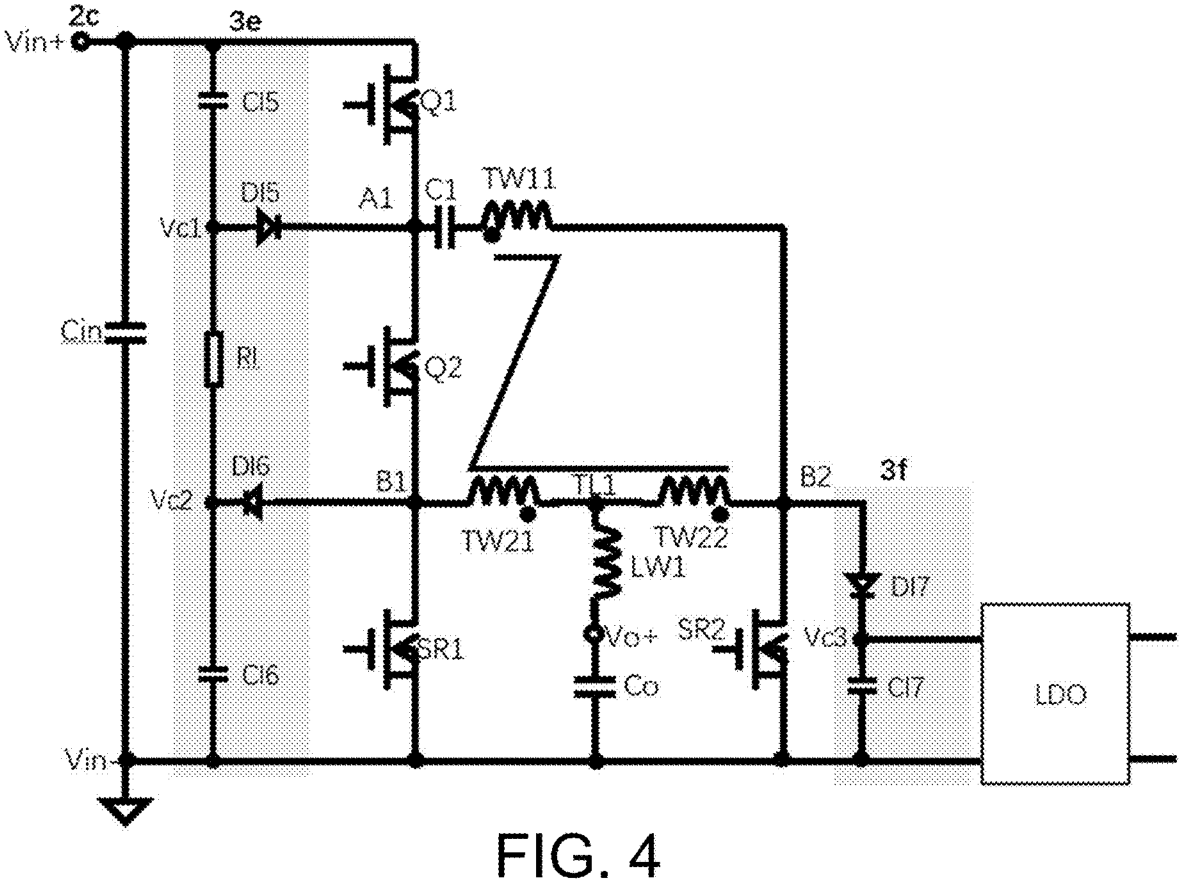
FIG. 4 is a schematic diagram of another clamping circuit of a power conversion circuit.

The application further provides clamping circuits 3*e* and 3*f* of voltage spikes of the two switching. The power conversion circuit 2*c* shown in FIG. 2C is taken as an example for description. The power conversion device further comprises clamping circuits 3*e* and 3*f*, as shown in FIG. 4. The clamping circuit 3*e* comprises two clamping diodes Dl5 and Dl6, two absorption capacitors Cl5, Cl6 and a discharging resistor R1. One end of the absorption capacitor Cl5 is electrically connected with the input positive terminal Vin+, the other end of the Cl5 and the positive electrode of the clamping diode Dl5 are electrically connected with the point Vc1, and the negative electrode of the Dl5 is electrically connected with the upper node A1. One end of the absorption capacitor Cl6 is electrically connected with the input negative terminal Vin−, the other end of the Cl6 is electrically connected with the negative electrode of the clamping diode Dl6 at the point VC2, and the positive electrode of the Dl6 is electrically connected with the lower node B1; and the discharging resistor R1 is bridged between the points Vc1 and Vc2 (ie, between the positive electrode of the clamping diode Dl5 and the negative electrode of the clamping diode Dl6). The clamping diode Dl5 and the absorption capacitor Cl5 are used for absorbing voltage spikes at the drain end and the source end of the upper switch Q1, and the clamping diode Dl6 and the absorption capacitor Cl6 are used for absorbing voltage spikes at the drain end and the source end of the lower switch SR1. The discharging resistor R1 provides an energy feedback path, so that the absorption capacitor Cl5 and Cl6 are connected in series and absorb the energy, and the absorbed energy can be fed back to the input capacitor Cin in a small loss mode; and the absorption capacitor Cl5 or Cl6 can continuously absorb voltage spikes corresponding to the drain-source of the switch in each switching period, and the power loss of the power conversion device is reduced. In another embodiment, the positive electrode of the clamping diode Dl6 can also be electrically connected with the lower node B2 and is used for absorbing voltage spikes at the drain-source of the lower switch SR2 together with the absorption capacitor Cl6. The clamping circuit 3*f* comprises a clamping diode Dl7 and an absorption capacitor C17, one end of the absorption capacitor C17 is electrically connected with the input negative terminal Vin−, the other end of the absorption capacitor C17 and the negative electrode of the clamping diode Dl7 are electrically connected to the point Vc3, and the positive electrode of the clamping diode Dl7 is electrically connected with the lower node B2. The power conversion device further comprises a linear voltage stabilizing circuit, and the input end of the linear voltage stabilizing circuit LDO is electrically connected with an input end electrical connection point Vc3; the clamping circuit 3*f* is used for absorbing voltage spikes at the drain-source of the lower switch SR2, and the energy absorbed by the absorption capacitor C17 is provided for the linear voltage stabilizing circuit and used for supplying power to the auxiliary circuit of the power conversion device, so that the absorption capacitor C17 can continuously absorb the voltage spikes at the drain-source of the switch SR2 in each switching period, and the power loss of the power conversion device is reduced.

Clamp circuits 3*a* and 3*b* shown in FIG. 3A, clamp circuits 3*c* shown in FIG. 3C, clamp circuits 3*d* shown in FIG. 3D, clamp circuits 3*e* and 3*f* shown in FIG. 4 can be combined and applied to power conversion devices 1A to 1C and 2A to 2C according to actual requirements, and are not limited to the combination of clamp circuits 3*a* and 3*b* shown in FIG. 3A, clamp circuits 3*c* shown in FIG. 3C, clamp circuits 3*d* shown in FIG. 3D, and clamp circuits 3*e* and 3*f* shown in FIG. 4.

Embodiment 3

Figure 5A:
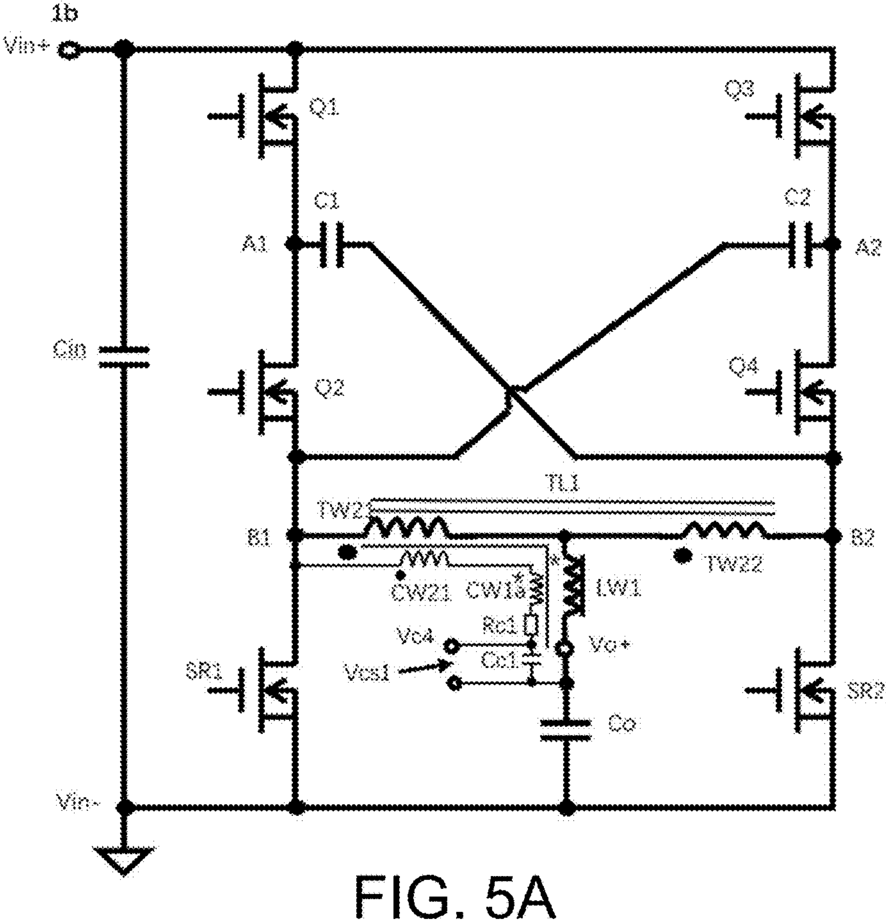
FIG. 5A and FIG. 5C are schematic diagrams of a current sampling circuit of a power conversion circuit.

The application provides a current sampling circuit and method. The current sampling circuit is suitable for power conversion circuits 1*b* and 1*c* shown in FIG. 1B and FIG. 1C as well as the power conversion circuits 2*b* and 2*c* shown in FIGS. 2B and 2C as an example. As shown in FIG. 5A, the power conversion device further comprises an auxiliary winding, a sampling resistor Rc1 and a sampling capacitor Cc1, the auxiliary winding, the sampling resistor Rc1 and the sampling capacitor Cc1 are electrically connected in series to form a sampling series branch of an output current, and the sampling series branch is bridged between the lower node B1 and the output positive terminal Vo+. The auxiliary winding comprises a first auxiliary winding CW21 and a second auxiliary winding CW1*a*, the first auxiliary winding CW21 is coupled to the low-voltage winding TW21, and the second auxiliary winding CW1*a* is coupled to the inductive winding LW1; the first end of the first auxiliary winding CW21 is connected to the lower node B1, the second end of the first auxiliary winding CW21 is connected with the first end of the second auxiliary winding CW1*a*, the second end of the second auxiliary winding CW1*a* is electrically connected to one end of the sampling resistor Rc1, the other end of the sampling resistor Rc1 is electrically connected with one end of the sampling capacitor Cc1, and the other end of the sampling capacitor Cc1 is electrically connected with the output positive terminal Vo+. The first end of the first auxiliary winding CW21 and the first end of the low-voltage winding TW21 are dotted terminals (ie, have the same polarity), and are labeled as point ends. The first end of the second auxiliary winding CW1*a* and the end of the winding junction TL1 of the inductor winding LW1 are dotted terminals and are marked as * ends. The voltage at the two ends of the sampling capacitor Cc1 is the current sampling voltage Vcs1 of the power conversion circuit. The specific principle is that the voltage at the two ends of the first auxiliary winding CW21 is used for counteracting with the alternating voltage at the two ends of the low-voltage winding TW21, the voltage at the two ends of the second auxiliary winding CW1*a* is used for counteracting with the alternating voltage at the two ends of the inductor winding LW1, and the sampling voltage Vcs1 is equal to the direct-current component of the voltage between the lower node B1 and the output positive terminal Vo+ due to the fact that the sampling series branch is bridged between the lower node B1 and the output positive terminal Vo+, that is, the magnitude of the output current of the power conversion circuit is reflected.

Figure 5B:
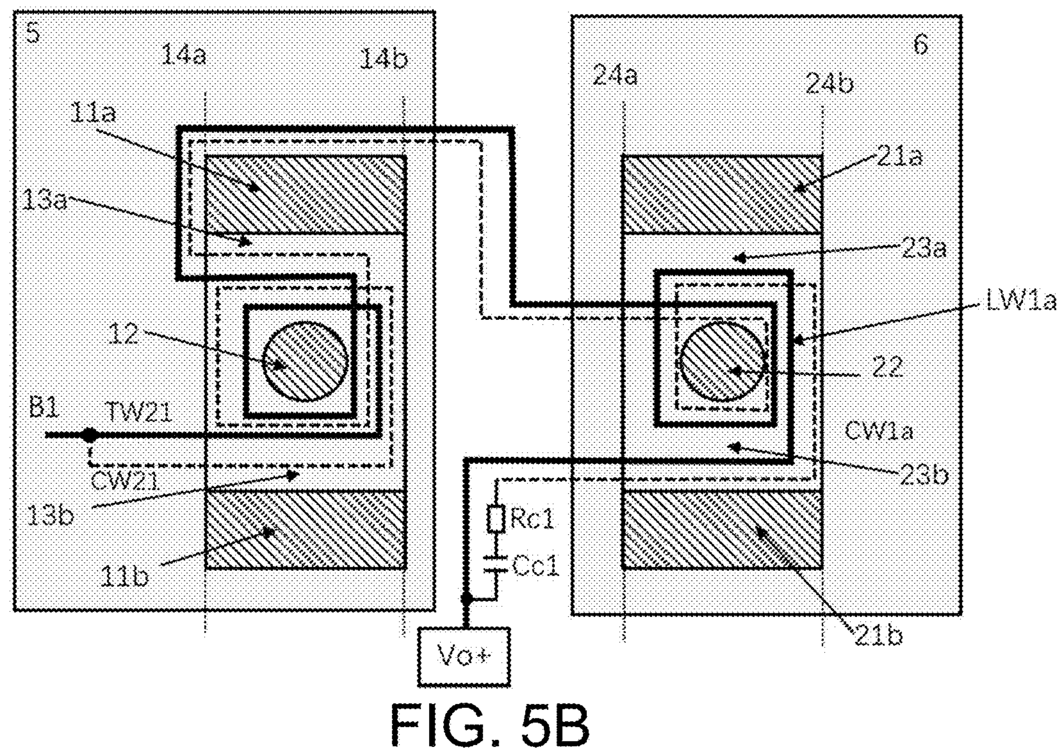
FIG. 5B and FIG. 5D are winding modes of an auxiliary winding.

A winding manner of the first auxiliary winding CW21 and the second auxiliary winding CW1*a* can be referred to as shown in FIG. 5B. The power conversion device further comprises a transformer assembly and an inductor assembly. The transformer assembly comprises a transformer magnetic core 5 and at least two low-voltage windings TW21 and TW22, and the inductor assembly comprises an inductor magnetic core 6 and an inductor winding LW1.

The transformer magnetic core 5 comprises two magnetic substrates (not shown), two transformer side columns 11*a* and 11*b*, and a transformer middle column 12, wherein the two transformer side columns 11*a* and 11*b* and one transformer middle column 12 are arranged between the two magnetic substrates, and are sequentially arranged according to the sequence of the side column, the middle column and the side column. A channel between the transformer middle column 12 and the transformer side column 11*a* is a transformer winding channel 13*a*, and a channel between the transformer middle column 12 and the transformer side column 11*b* is a transformer winding channel 13*b*. The magnetic core 10 further comprises two opposite sides which are respectively a first transformer winding channel side 14*a* and a second transformer winding channel side 14*b*, and the transformer winding channel 13*a* and the transformer winding channel 13*b* both penetrate through the first transformer winding channel side 14*a* and the second transformer winding channel side 14*b*.

The inductor magnetic core 6 comprises two magnetic substrates (not shown), two inductor side columns 21*a* and 21*b*, and an inductor middle column 22, wherein the two inductor side columns 21*a* and 21*b* and one inductor middle column 22 are arranged between the two magnetic substrates, and are sequentially arranged according to the sequence of the side column, the middle column and the side column. A channel between the inductor middle column 22 and the inductor side column 21*a* is an inductor winding channel 23*a*, and a channel between the inductor middle column 22 and the inductor side column 21*b* is an inductor winding channel 23*b*; and the inductor magnetic core 20 further comprises two opposite sides which are respectively a first inductor winding channel side 24*a* and a second inductor winding channel side 24*b*.

The transformer core 5 and the inductor core 6 are placed side by side, so that the second transformer winding channel side 14*b* is adjacent to the first inductor winding channel side 24*a*, and the transformer winding channel 13*a* or the transformer winding channel 13*b* is approximately parallel to the inductor winding channel 23*a* or the inductor winding channel 23*b*. When the first transformer winding channel side 14*a* is defined as the left side of the magnetic assembly 4, the second inductor winding channel side 24*b* is the right side of the magnetic assembly 4; and the upper side and the lower side of the magnetic core assembly 4 are located between the left side and the right side of the magnetic core assembly 4.

In the embodiment, the inductor winding LW1 is equivalently divided into LW1*a* and LW2*a*. The first winding comprises a low-voltage winding TW21 and an inductor winding LW1*a*, and the second winding comprises a low-voltage winding TW22 and an inductor winding LW1B. In this embodiment, the first end of the first winding (i.e., the first end of the low-voltage winding TW21) and the first end of the second winding (i.e., the first end of the low-voltage winding TW22) are both provided on the first transformer winding channel side 14*a*, and both the second end of the first winding (i.e. the output positive terminal Vo+ electrically connected to the inductor winding LW1*a*) and the second end of the second winding (i.e. the output positive terminal Vo+ electrically connected to the inductor winding LW1*b*) are provided on the lower side of the transformer assembly and the inductor assembly.

Specifically, as shown in FIG. 5B, the low-voltage winding TW21 is wound two circles around the middle column 12 in a counterclockwise direction (defined as a first direction) from the first end to the second end. The second end of the low-voltage winding TW21 is wound around the side column 11*a* along the outer side of the transformer magnetic core 10 from the first transformer winding channel side 14*a*, passes through the second transformer winding channel side 14*b* and is electrically connected with the inductor winding LW1*a*, then the inductor winding LW1*a* is wound two circles around the inductor middle column 22 from the first end to the second end in the clockwise direction (defined as the second direction), and is electrically connected with the output positive terminal Vo+ (equivalent to the output positive pin) of the power conversion circuit after passing through the first inductor winding channel side 24*a*.

The first auxiliary winding CW21 is wound two circles around the middle column 12 in the counterclockwise direction from the first end (i.e., the lower node B1) to the second end along the winding path of the low-voltage winding TW21, then is wound around the side column 11*a* along the outer side of the transformer magnetic core 10 from the first transformer winding channel side 14*a*, passes through the second transformer winding channel side 14*b*, and is electrically connected with the second auxiliary winding CW1*a*; the second auxiliary winding CW1*a* is wound two circles around the inductor middle column 22 in the clockwise direction from the first end to the second end and is electrically connected with one end of the sampling resistor Rc1 after passing through the first inductor winding channel side 24*a*, the other end of the sampling resistor Rc1 is electrically connected with one end of the sampling capacitor Cc1, and the other end of the sampling capacitor Cc1 is electrically connected with the output positive terminal Vo+. The first auxiliary winding CW21 and the second auxiliary winding CW1*a* are respectively wound along the winding path of the low-voltage winding TW21 and the inductor winding LW1*a*, so that the coupling of the first auxiliary winding CW21 and the low-voltage winding TW21 and the coupling of the second auxiliary winding CW2*a* and the inductor winding LW1*a* can be realized, so that the voltage at the two ends of the first auxiliary winding CW21 can be counteracted with the alternating-current voltage at the two ends of the low-voltage winding TW21, and the voltage at the two ends of the second auxiliary winding CW1*a* can be counteracted with the alternating-current voltage at the two ends of the inductor winding L1*a*.

Figure 5C:
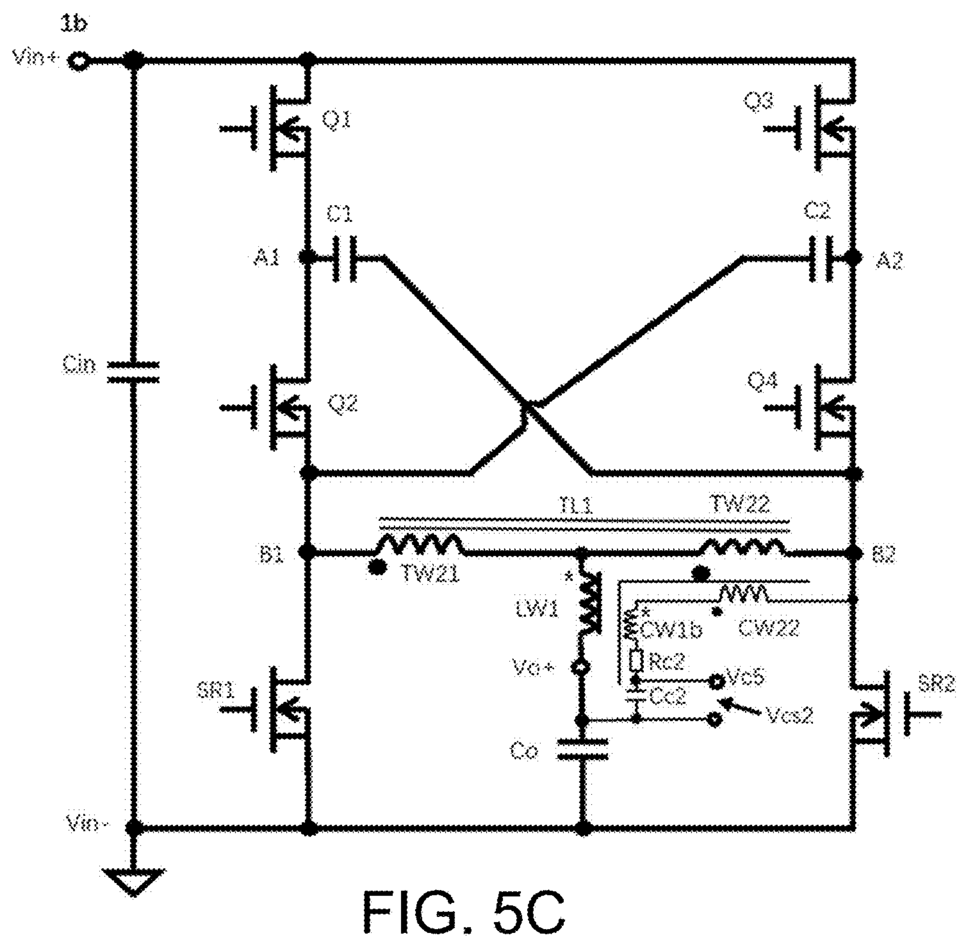

The auxiliary winding can also be as shown in FIG. 5C. The power conversion device further comprises an auxiliary winding, a sampling resistor Rc2 and a sampling capacitor Cc2. The auxiliary winding, the sampling resistor Rc2 and the sampling capacitor Cc2 are electrically connected in series to form a sampling series branch of an output current. The sampling series branch is bridged between the lower node B2 and the output positive terminal Vo+.

The auxiliary winding comprises a first auxiliary winding CW22 and a second auxiliary winding CW1*b*, the first auxiliary winding CW22 is coupled with the low-voltage winding TW22, and the second auxiliary winding CW1*b* is coupled with the inductor winding LW1. The second end of the first auxiliary winding CW22 and the second end of the low-voltage winding TW22 are dotted terminals (equivalent to the same polarity), and are marked as point ends. The first end of the second auxiliary winding CW1*b* and the end of the winding junction TL1 of the inductor winding LW1 are dotted terminals and are marked as * ends. The first end of the first auxiliary winding CW22 is electrically connected with the lower node B2, the second end of the first auxiliary winding CW22 is electrically connected with the first end of the second auxiliary winding CW1*b*, the second end of the CW1*b* is electrically connected with one end of the sampling resistor Rc2, the other end of the sampling resistor Rc2 is electrically connected with one end of the sampling capacitor Cc2, and the other end of the sampling capacitor Cc2 is electrically connected with the output positive terminal Vo+. The voltage at the two ends of the sampling capacitor Cc2 is the current sampling voltage Vcs2 of the power conversion circuit. The specific principle is that the voltage across the first auxiliary winding CW22 is used for counteracting with the alternating voltage at the two ends of the low-voltage winding TW22, the voltage at the two ends of the second auxiliary winding CW1*b* is used for counteracting with the alternating voltage at the two ends of the inductor winding LW1, and the sampling voltage Vcs2 is equal to the direct-current component of the voltage between the lower node B2 and the output positive terminal Vo+ due to the fact that the sampling series branch is bridged between the lower node B2 and the output positive terminal Vo+, that is, the magnitude of the output current of the power conversion circuit is reflected.

Figure 5D:
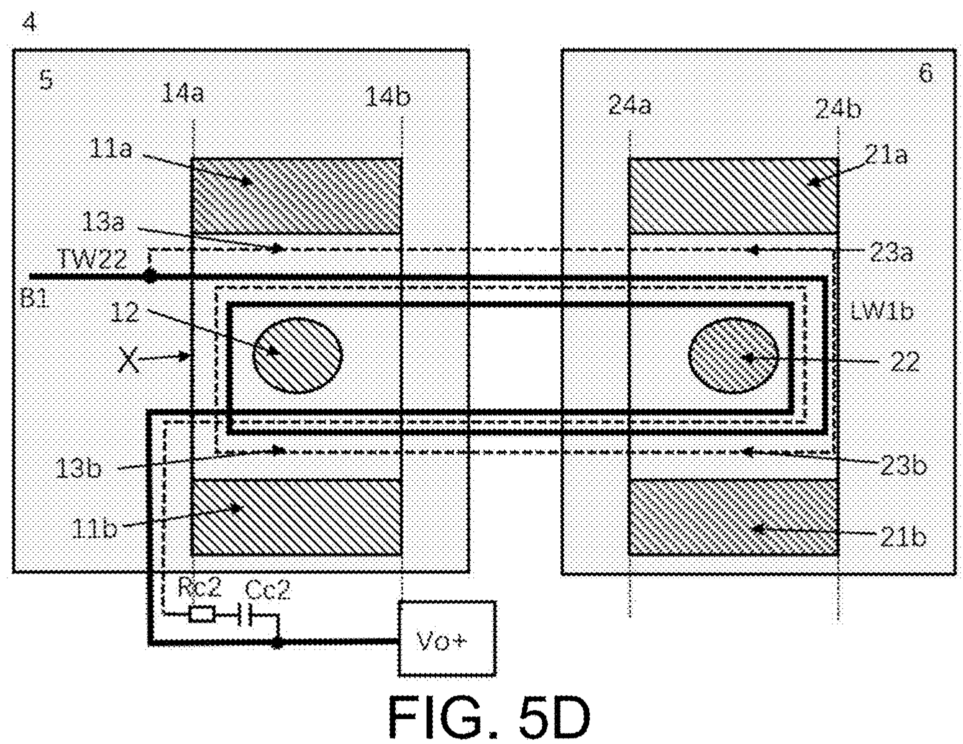

In detail, as shown in FIG. 5D, the second winding (i.e., the low-voltage winding TW22 and the inductor winding LW1*b*) sequentially passes through the transformer winding channel 13*a* (the partial winding of the low-voltage winding TW22), the inductor winding channel 23*a* (which is part of the winding of the equivalent inductor winding LW1*b*), the inductor winding channel 23*b* (which is part of the winding of the equivalent inductor winding LW1*b*) and the transformer winding channel 13*b* (which is part of the winding of the low-voltage winding TW22) from the first end to the second end, that is, winding a circle around the transformer middle column 12 and the inductor middle column 22 to reach the midpoint X of the first winding. In the embodiment, after the second winding is wound two circles around the transformer middle column and the inductor middle column, the second winding is electrically connected with the output positive terminal Vo+ (equivalent to the output positive pin) of the power conversion circuit.

Correspondingly, the auxiliary winding (i.e., the first auxiliary winding CW22 and the second auxiliary winding LW1*b*) along the winding path of the second winding, sequentially penetrates through the transformer winding channel 13*a* (which is part of the winding of the first auxiliary winding CW22), the inductor winding channel 23*a* (which is part of the winding of the second auxiliary winding CW1*b*), the inductor winding channel 23*b* (which is part of the winding of the second auxiliary winding CW1*b*) and the transformer winding channel 13*b* (which is part of the winding of the first auxiliary winding CW22) from the first end of the first auxiliary winding CW22 to the second end of the second auxiliary winding LW1*b*, that is, winding a circle around the transformer middle column 12 and the inductor middle column 22 is completed. In the embodiment, after the auxiliary winding is wound two circles around the transformer middle column and the inductor middle column, the auxiliary winding is electrically connected with one end of the sampling resistor Rc2, the other end of the sampling resistor Rc2 is electrically connected with one end of the sampling capacitor Cc2, and the other end of the sampling capacitor Cc2 is electrically connected with the output positive terminal Vo+. The first auxiliary winding CW22 and the second auxiliary winding CW1*b* are respectively wound along the winding path of the low-voltage winding TW22 and the inductor winding L1*b*, so that the coupling of the first auxiliary winding CW22 and the low-voltage winding TW22, and the coupling of the second auxiliary winding CW1*b* and the inductor winding L1*b* can be realized, so that the voltage at the two ends of the first auxiliary winding CW21 can be counteracted with the alternating-current voltage at the two ends of the low-voltage winding TW21, and the voltage at the two ends of the second auxiliary winding CW1*a* can be counteracted with the alternating-current voltage at the two ends of the low-voltage winding L1*a*.

In another embodiment, the first auxiliary winding CW22 and the second auxiliary winding CW1*b* is wound a circle around the transformer middle column and the inductor middle column, the first auxiliary winding CW22 and the second auxiliary winding CW1B are electrically connected with one end of the sampling resistor Rc2, the other end of the sampling resistor Rc2 is electrically connected with one end of the sampling capacitor Cc2, and the other end of the sampling capacitor Cc2 is electrically connected with the output positive terminal Vo+. In this case, the first end of the first auxiliary winding CW22 is connected with the midpoint X of the first winding. In this embodiment, the sampling voltage Vcs2 can also reflect the magnitude of the output current of the power conversion circuit.

In another embodiment, the power conversion device may also include two sampling series branches, as shown in FIG. 5A and FIG. 5C respectively. Two sampling voltages Vcs1 and Vcs2 are respectively obtained at two ends of the two sampling capacitors Cc1 and Cc2. Moreover, the two sampling capacitors Cc1 and Cc2 are connected in parallel, so that the voltage amplitude of the sampling voltage Vcs1 or Vcs2 can be doubled, thereby improving the resolution ratio of the current sampling circuit. The winding mode can refer to the winding mode shown in FIG. 5B and FIG. 5D, but is not limited thereto, as long as the auxiliary winding is wound along the winding path of the low-voltage winding and the inductor winding.

According to the current sampling circuit and method disclosed by the application, the current signal of the power conversion device is obtained through the auxiliary winding tightly coupled with the low-voltage winding and the inductor winding, and the current signal is processed through the filtering and proportional unit. The method is simple and easy to implement, the current signal of the power conversion device can be completely obtained, and the controller can conveniently control or monitor the current of the power conversion device.

According to the transformer magnetic core or the magnetic column (the middle column) in the inductor magnetic core, the magnetic columns (side columns and the middle column) in the transformer magnetic core or the inductor magnetic core can be independently formed, the magnetic columns can be integrally formed with one magnetic substrate, or each magnetic column is divided into two parts, and each part is integrally formed with one magnetic substrate; and the transformer magnetic core material and the driving magnetic core material can be made of ferrite. The cross section of the magnetic column connected to the magnetic substrate of the transformer magnetic core or the inductor magnetic core and the cross section of the magnetic substrate may be rectangular, square, circular, oval, etc., and are not limited thereto.

The switch disclosed by the application can be used for realizing the functions of the switch disclosed by the application, such as a Si MOSFET, SiC MOSFET, GaN MOSFET or IGBT MOSFET etc., the function of the switch disclosed by the application can be realized.

The power conversion device can be part of the electronic device or an independent power supply module as long as the technical features and advantages disclosed by the application can be met.

The "equal" or "same" or "equal to" disclosed by the application needs to consider the parameter distribution of engineering, and the error distribution is within +/−30%; the two line segments or the two straight lines are defined as the two line segments or the included angle between the two line segments or the two straight lines is less than or equal to 45 degrees; the included angle between the two line segments or the two straight lines is within the range of [60, 120]; and the definition of the phase error phase also needs to consider the parameter distribution of the project, and the error distribution of the phase error degree is within +/−30%.

What is claimed is:

1. A power conversion device, comprising: an input positive terminal, an input negative terminal, an output positive terminal, an output negative terminal and a three-switch bridge arm, wherein the input negative terminal is in short connection with the output negative terminal;

wherein the three-switch bridge arm is bridged between the input positive terminal and the input negative terminal and comprises a first upper switch, a first middle switch and a first lower switch, the first upper switch and the first middle switch are electrically connected to a first upper node, and the first middle switch and the first lower switch are electrically connected to a first lower node;

wherein the power conversion device further comprises a second lower switch, a magnetic assembly, a first flying capacitor, an input capacitor and an output capacitor, and the magnetic assembly comprises a first end, a second end and a third end; the first end of the magnetic assembly is electrically connected to the first lower node, the second end of the magnetic assembly and the second lower switch are electrically connected to a second lower node, the second lower switch is bridged between the second lower node and the input negative terminal, the third end of the magnetic assembly is electrically connected with the output positive terminal, and the first flying capacitor is bridged between the first upper node and the second lower node;

wherein the input capacitor is bridged between the input positive terminal and the input negative terminal, and the output capacitor is bridged between the output positive terminal and the output negative terminal;

wherein the power conversion device further comprises a first clamping diode and a first absorption capacitor, a positive electrode of the first clamping diode is electrically connected to the first lower node, a negative electrode of the first clamping diode is electrically connected to the first upper node, one end of the first absorption capacitor is electrically connected to the first upper node, and the other end of the first absorption capacitor is electrically connected to the second lower node.

2. The power conversion device of claim 1, wherein the first clamping diode and the first absorption capacitor are arranged close to the first lower switch, and the second lower switch is arranged adjacent to the first lower switch.

3. The power conversion device of claim 1, further comprising: a second upper switch, a second middle switch and a second flying capacitor; wherein the second upper switch and the second middle switch are electrically connected to a second upper node, the second middle switch and the second lower switch are electrically connected to a second lower node, the second upper switch is electrically connected to the input positive terminal, and the second flying capacitor is bridged between the second upper node and the first lower node.

4. The power conversion device of claim 3, further comprising: a second clamping diode and a second absorption capacitor, wherein a positive electrode of the second clamping diode is electrically connected with the second lower node, a negative electrode of the second clamping diode is electrically connected with the second upper node, one end of the second absorption capacitor is electrically connected with the second upper node, and the other end of the second absorption capacitor is electrically connected with the first lower node.

5. The power conversion device of claim 1, further comprising: a third clamping diode and a third absorption capacitor; wherein a negative electrode of the third clamping diode is electrically connected with the second lower node, and a positive electrode of the third clamping diode is electrically connected with the input negative terminal; one end of the third absorption capacitor is electrically connected with the input positive terminal, and the other end of the third absorption capacitor is electrically connected with the input negative terminal.

6. The power conversion device of claim 3, further comprising: a fourth clamping diode and a fourth absorption capacitor; wherein a negative electrode of the fourth clamping diode is electrically connected with the first lower node, and a positive electrode of the fourth clamping diode is electrically connected with the input negative terminal; one end of the fourth absorption capacitor is electrically connected with the input positive terminal, and the other end of the fourth absorption capacitor is electrically connected with the input negative terminal.

7. The power conversion device of claim 1, further comprising: a fifth clamping diode, a sixth clamping diode, a fifth absorption capacitor, a sixth absorption capacitor and a discharging resistor, wherein a negative electrode of the fifth clamping diode is electrically connected with the first upper node, a positive electrode of the fifth clamping diode is electrically connected with one end of the fifth absorption capacitor, and the other end of the fifth absorption capacitor is electrically connected with the input positive terminal; a positive electrode of the sixth clamping diode is electrically connected with the second lower node, a negative electrode of the sixth clamping diode is electrically connected with one end of the sixth absorption capacitor, the other end of the sixth absorption capacitor is electrically connected with the input negative terminal, and the discharging resistor is bridged between the positive electrode of the fifth clamping diode and the negative electrode of the sixth clamping diode.

8. The power conversion device of claim 1, further comprising: a seventh clamping diode, a seventh absorption capacitor and a linear voltage stabilizing circuit, wherein a positive electrode of the seventh clamping diode is electrically connected with the second lower node, a negative electrode of the seventh clamping diode is electrically connected with one end of the seventh absorption capacitor, the other end of the seventh absorption capacitor is electrically connected with the input negative terminal, and the negative electrode of the seventh clamping diode is electrically connected with one end of the linear voltage stabilizing circuit.

9. The power conversion device of claim 1, wherein the magnetic assembly comprises a first low-voltage winding and a second low-voltage winding, and the first low-voltage winding and the second low-voltage winding are magnetically coupled; a non-dotted terminal of the first low-voltage winding and a dotted terminal of the second low-voltage winding are electrically connected to the output positive terminal, a dotted terminal of the first low-voltage winding is electrically connected to the first lower node, and a non-dotted terminal of the second low-voltage winding is electrically connected to the second lower node.

10. The power conversion device of claim 1, wherein the magnetic assembly comprises an inductor winding, a first low-voltage winding and a second low-voltage winding, and the first low-voltage winding and the second low-voltage winding are magnetically coupled; a dotted terminal of the first low-voltage winding is electrically connected to the first lower node, and a non-dotted terminal of the first low-voltage winding is electrically connected to a winding junction; a non-dotted terminal of the second low-voltage winding is electrically connected to the second lower node, and a dotted terminal of the second low-voltage winding is electrically connected to the winding junction; one end of the inductor winding is electrically connected to the winding junction, and the other end of the inductor winding is electrically connected to the output positive terminal.

11. A power conversion device, comprising: an input positive terminal, an input negative terminal, an output positive terminal, an output negative terminal and a three-switch bridge arm, wherein the input negative terminal is in short connection with the output negative terminal;

wherein the three-switch bridge arm is bridged between the input positive terminal and the input negative terminal and comprises a first upper switch, a first middle switch and a first lower switch, the first upper switch and the first middle switch are electrically connected to a first upper node, and the first middle switch and the first lower switch are electrically connected to a first lower node;

wherein the power conversion device further comprises a second lower switch, a winding combination, a first flying capacitor, an input capacitor and an output capacitor, and the winding combination comprises a first end, a second end and a third end; the first end of the winding combination is electrically connected to the first lower node, the second end of the winding combination and the second lower switch are electrically connected to a second lower node, the second lower switch is bridged between the second lower node and the input negative terminal, the third end of the winding combination is electrically connected with the output positive terminal, and the first flying capacitor is bridged between the first upper node and the second lower node;

wherein the input capacitor is bridged between the input positive terminal and the input negative terminal, and the output capacitor is bridged between the output positive terminal and the output negative terminal;

wherein the winding combination further comprises a first low-voltage winding and a second low-voltage winding, the first low-voltage winding and the second low-voltage winding are connected in series and bridged between the first end and the second end, and a number of turns of the first low-voltage winding is the same as a number of turns of the second low-voltage winding;

wherein the power conversion device further comprises a first clamping diode, a first absorption capacitor and a clamping bridge arm circuit; a positive electrode of the first clamping diode is electrically connected with the first lower node, and a negative electrode of the first clamping diode is electrically connected with a first clamping point; one end of the first absorption capacitor is electrically connected with the first clamping point, and the other end of the first absorption capacitor is electrically connected with the input negative terminal; one end of the clamping bridge arm circuit is electrically connected with the first clamping point, and the other end of the clamping bridge arm circuit is electrically connected with the input positive terminal; and the clamping bridge arm circuit comprises a clamping winding, the clamping winding, the first low-voltage winding and the second low-voltage winding are magnetically coupled.

12. The power conversion device of claim 11, wherein the clamping bridge arm circuit is a clamping half-bridge circuit, and the clamping bridge arm circuit further comprises a third clamping diode, a fourth clamping diode, a third absorption capacitor, a fourth absorption capacitor, a second clamping point and a third clamping point;

wherein a positive electrode of the third clamping diode is electrically connected with a second clamping point, and a negative electrode of the third clamping diode is electrically connected with the input positive terminal; a positive electrode of the fourth clamping diode is electrically connected with the first clamping point, and a negative electrode of the fourth clamping diode is electrically connected with a second clamping point; one end of the third absorption capacitor is electrically connected with a third clamping point, and the other end of the fourth absorption capacitor is electrically connected with the input positive terminal; one end of the fourth absorption capacitor is electrically connected with the first clamping point, and the other end of the fourth absorption capacitor is electrically connected with the third clamping point;

wherein the clamping winding is bridged between the second clamping point and the third clamping point; and a number of turns of the clamping winding is the same as a number of turns of the first low-voltage winding.

13. The power conversion device of claim 11, wherein the clamping bridge arm circuit is a clamping full-bridge circuit, and the clamping bridge arm circuit further comprises a third clamping diode, a fourth clamping diode, a fifth clamping diode, a sixth clamping diode, a second clamping point and a third clamping point;

wherein a positive electrode of the third clamping diode is electrically connected with the second clamping point, and a negative electrode of the third clamping diode is electrically connected with the input positive terminal; a positive electrode of the fourth clamping diode is electrically connected with the first clamping point, and a negative electrode of the fourth clamping diode is electrically connected with the second clamping point; a positive electrode of the fifth clamping diode is electrically connected with a third clamping point, and a negative electrode of the fifth clamping diode is electrically connected with the input positive terminal; a positive electrode of the sixth clamping diode is electrically connected with the first clamping point, and a negative electrode of the sixth clamping diode is electrically connected with the third clamping point;

wherein the clamping winding is bridged between the second clamping point and the third clamping point; and a number of turns of the clamping winding is twice of a number of turns of the first low-voltage winding.

14. The power conversion device of claim 11, further comprising: a second clamping diode and a second absorption capacitor; a positive electrode of the second clamping diode is electrically connected with the second lower node, and a negative electrode of the second clamping diode is electrically connected with the first clamping point; one end of the second absorption capacitor is electrically connected with the first clamping point, and the other end of the second absorption capacitor is electrically connected with the input negative terminal.

15. The power conversion device of claim 11, further comprising: a second upper switch, a second middle switch and a second flying capacitor; wherein the second upper switch and the second middle switch are electrically connected to a second upper node, the second middle switch and the second lower switch are electrically connected to a second lower node, the second upper switch is electrically connected with the input positive terminal, and the second flying capacitor is bridged between the second upper node and the first lower node.

16. The power conversion device of claim 11, further comprising: a third clamping diode and a third absorption capacitor; wherein a negative electrode of the third clamping diode is electrically connected to a second lower node, and a positive electrode of the third clamping diode is electrically connected to the input negative terminal; one end of the third absorption capacitor is electrically connected to the input positive terminal, and the other end of the third absorption capacitor is electrically connected to the input negative terminal.

17. The power conversion device of claim 15, further comprising: a fourth clamping diode and a fourth absorption capacitor; wherein a negative electrode of the fourth clamping diode is electrically connected to the first lower node, and a positive electrode of the fourth clamping diode is electrically connected to the input negative terminal; one end of the fourth absorption capacitor is electrically connected to the input positive terminal, and the other end of the fourth absorption capacitor is electrically connected to the input negative terminal.

18. A power conversion device, comprising: an input positive terminal, an input negative terminal, an output positive terminal, an output negative terminal, a three-switch bridge arm, an upper node and a lower node, wherein the input negative terminal and the output negative terminal are short-circuited; the upper node comprises a first upper node and a second upper node, and the lower node comprises a first lower node and a second lower node; the input negative terminal and the output negative terminal are short-circuited;

wherein the three-switch bridge arm is bridged between the input positive terminal and the input negative terminal and comprises a first upper switch, a first middle switch and a first lower switch, the first upper switch and the first middle switch are electrically connected to the first upper node, and the first middle switch and the first lower switch are connected to the first lower node;

wherein the power conversion device further comprises a second lower switch, a winding combination, a first flying capacitor, an input capacitor and an output capacitor, and the winding combination comprises a first end, a second end and a third end; the first end of the winding combination is electrically connected to the first lower node, the second end of the winding combination and the second lower switch are electrically connected to the second lower node, the second lower switch is bridged between the second lower node and the input negative terminal, the third end of the winding combination is electrically connected with the output positive terminal, and the first flying capacitor is bridged between the first upper node and the second lower node;

wherein the input capacitor is bridged between the input positive terminal and the input negative terminal, and the output capacitor is bridged between the output positive terminal and the output negative terminal;

wherein the power conversion device further comprises a first clamping diode, a first absorption capacitor and a first linear voltage stabilizing circuit, wherein a positive electrode of the first clamping diode is electrically connected with one of the first lower node and the second lower node, a negative electrode of the first clamping diode is electrically connected with one end of the first absorption capacitor, the other end of the first absorption capacitor is electrically connected with the input negative terminal, and the negative electrode of the first clamping diode is electrically connected with one end of the first linear voltage stabilizing circuit.

19. The power conversion device of claim 18, further comprising: a third clamping diode and a third absorption capacitor, wherein a negative electrode of the third clamping diode is electrically connected with the second lower node, a positive electrode of the third clamping diode is electrically connected with the input negative terminal, one end of the third absorption capacitor is electrically connected with the input positive terminal, and the other end of the third absorption capacitor is electrically connected with the input negative terminal.

20. The power conversion device of claim 18, further comprising: a fifth clamping diode, a sixth clamping diode, a fifth absorption capacitor, a sixth absorption capacitor and a discharging resistor, wherein a negative electrode of the fifth clamping diode is electrically connected with the first upper node, a positive electrode of the fifth clamping diode is electrically connected with one end of the fifth absorption capacitor, and the other end of the fifth absorption capacitor is electrically connected with the input positive terminal; a positive electrode of the sixth clamping diode is electrically connected with another one of the first lower node and the second lower node which is not electrically connected with the positive electrode of the first clamping diode, a negative electrode of the sixth clamping diode is electrically connected with one end of the sixth absorption capacitor, the other end of the sixth absorption capacitor is electrically connected with the input negative terminal, and the discharging resistor is bridged between the positive electrode of the fifth clamping diode and the negative electrode of the sixth clamping diode.

21. The power conversion device of claim 18, further comprising: a high-voltage winding, and the high-voltage winding, wherein the first flying capacitor being connected in series between the first upper node and the second lower node, and the high-voltage winding being coupled to the winding in a combined manner.

22. A power conversion device, comprising: an input positive terminal, an input negative terminal, an output positive terminal, an output negative terminal, a three-switch bridge arm, an upper node and a lower node, wherein the upper node comprises a first upper node and a second upper node, and the lower node comprises a first lower node and a second lower node; the input negative terminal and the output negative terminal are short-circuited;

wherein the three-switch bridge arm is bridged between the input positive terminal and the input negative terminal, the three-switch bridge arm comprises a first upper switch, a first middle switch and a first lower switch, the first upper switch and the first middle switch are electrically connected to the first upper node, and the first middle switch and the first lower switch are connected to the first lower node;

wherein the power conversion device further comprises a second lower switch, a low-voltage winding, an inductor winding, a first flying capacitor, an input capacitor and an output capacitor; the low-voltage winding comprises a first low-voltage winding and a second low-voltage winding, a first end of the first low-voltage winding is electrically connected to the first lower node, a first end of the second low-voltage winding is electrically connected with the second lower node, a second end of the first low-voltage winding and a second end of the second low-voltage winding are electrically connected with one end of the inductor winding, and the other end of the inductor winding is electrically connected with the output positive terminal; the second lower switch is bridged between the second lower node and the input negative terminal, and the first flying capacitor is bridged between the first upper node and the second lower node;

wherein the input capacitor is bridged between the input positive terminal and the input negative terminal, and the output capacitor is bridged between the output positive terminal and the output negative terminal;

wherein the power conversion device further comprises an auxiliary winding, a first sampling resistor and a first sampling capacitor, the auxiliary winding, the first sampling resistor and the first sampling capacitor are electrically connected in series to form a first series sampling branch, and the first series sampling branch is bridged between one of the first lower node and the second lower node and the output positive terminal; the auxiliary winding comprises a first auxiliary winding and a second auxiliary winding, the first auxiliary winding is coupled with one of the first low-voltage winding and the second low-voltage winding, the second auxiliary winding is coupled with the inductor winding, and a voltage at two ends of the first sampling capacitor is a first current sampling voltage; and the first auxiliary winding and the second auxiliary winding are electrically connected in series, and the auxiliary winding is wound along a winding path of the low-voltage winding and the winding path of the inductor winding.

23. The power conversion device of claim 22, wherein a first end of the second auxiliary winding and a first end of the inductor winding are dotted terminals.

24. The power conversion device of claim 22, further comprising a second upper switch, a second middle switch and a second flying capacitor; wherein the second upper switch and the second middle switch are electrically connected to the second upper node, the second middle switch and the second lower switch are electrically connected to the second lower node, the second upper switch is electrically connected to the input positive terminal, and the second flying capacitor is bridged between the second upper node and the first lower node.

25. The power conversion device of claim 22, further comprising: a transformer magnetic core and an inductor magnetic core; wherein the transformer magnetic core comprises two magnetic substrates, two transformer side columns and a transformer middle column; the two transformer side columns and the transformer middle columns are arranged between the two magnetic substrates, and the two transformer side columns and the transformer middle columns are sequentially arranged according to a sequence of one of the two transformer side columns, the transformer middle column and another one of the two transformer side columns; and a channel between the transformer middle column and the two transformer side columns is a first transformer winding channel and a second transformer winding channel respectively; the transformer magnetic core further comprises two opposite sides which are a first transformer winding channel side and a second transformer winding channel side respectively, and the first transformer winding channel and the second transformer winding channel both penetrate through the first transformer winding channel side and the second transformer winding channel side; the inductor magnetic core comprises two magnetic substrates, two inductor side columns and an inductor middle column; the two inductor side columns and the inductor middle column are arranged between the two magnetic substrates, and the two inductor side columns and the inductor middle column are sequentially arranged according to a sequence of one of the two inductor side columns, the inductor middle column and another one of the two inductor side columns; a channel between the inductor middle column and the two inductor side columns is a first inductor winding channel and a second inductor winding channel respectively; the inductor magnetic core further comprises two opposite sides which are a first inductor winding channel side and a second inductor winding channel side respectively, and the first inductor winding channel and the second inductor winding channel both penetrate through the first inductor winding channel side and the second inductor winding channel side; and the second transformer winding channel side is arranged adjacent to the first inductor winding channel side.

26. The power conversion device of claim 25, wherein the first auxiliary winding is wound around two circles in a first direction from the first end to the second end, then the first auxiliary winding is wound around the two transformer side columns along an outer side of the transformer magnetic core from the first transformer winding channel side, and then the first auxiliary winding is electrically connected with the second auxiliary winding through the second transformer winding channel side; the second auxiliary winding is wound two circles around the inductor middle column in a second direction from the first end to the second end, passes through the first inductor winding channel side, and is electrically connected with an output positive pin of the power conversion circuit through the first sampling resistor and the first sampling capacitor which are connected in series.

27. The power conversion device of claim 25, wherein the auxiliary winding sequentially penetrates through the first transformer winding channel, the first inductor winding channel, the second inductor winding channel and the second transformer winding channel from a first end of the first auxiliary winding to a second end of the second auxiliary winding, and after two circles are wound around the transformer middle column and the inductor middle column, the auxiliary winding is electrically connected with an output positive pin of the power conversion circuit through the first sampling resistor and the first sampling capacitor which are connected in series.

* * * * *